US012689989B2

(12) United States Patent
Yuan et al.

(10) Patent No.: US 12,689,989 B2
(45) Date of Patent: Jul. 21, 2026

(54) POWER CONTROL PARAMETER DETERMINING METHOD AND APPARATUS

(71) Applicant: HUAWEI TECHNOLOGIES CO., LTD., Shenzhen (CN)

(72) Inventors: Shitong Yuan, Chengdu (CN); Fengwei Liu, Chengdu (CN); Xi Zhang, Chengdu (CN); Lei Chen, Shenzhen (CN); Bo Fan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 18/482,003

(22) Filed: Oct. 5, 2023

(65) Prior Publication Data

US 2024/0049143 A1     Feb. 8, 2024

Related U.S. Application Data

(63) Continuation of application No. PCT/CN2022/084612, filed on Mar. 31, 2022.

(30) Foreign Application Priority Data

Apr. 6, 2021     (CN) .......................... 202110369437.2

(51) Int. Cl.
| | |
|---|---|
| *H04W 52/14* | (2009.01) |
| *H04W 52/24* | (2009.01) |
| *H04W 72/23* | (2023.01) |

(52) U.S. Cl.
CPC ....... *H04W 52/146* (2013.01); *H04W 52/242* (2013.01); *H04W 72/23* (2023.01)

(58) Field of Classification Search
CPC . H04W 52/146; H04W 52/242; H04W 72/23; H04W 52/325; H04W 52/54; H04L 5/0053
See application file for complete search history.

(56) References Cited

U.S. PATENT DOCUMENTS

| | | | | |
|---|---|---|---|---|
| 2023/0292250 A1* | 9/2023 | Määttänen | .......... | H04W 52/242 |
| 2023/0397193 A1* | 12/2023 | Liu | ........................ | H04W 52/08 |

(Continued)

FOREIGN PATENT DOCUMENTS

| | | |
|---|---|---|
| WO | 2021203404 A1 | 10/2021 |

OTHER PUBLICATIONS

OPPO:"Enhancements on Multi-Beam Operation". 3GPP TSG RAN WG1 #104-e, e-Meeting, Jan. 25-Feb. 5, 2021, R1-2100118, total 25 pages.

(Continued)

*Primary Examiner* — Fayyaz Alam

(57)     ABSTRACT

This application provides a power control parameter determining method and an apparatus, to simplify a beam indication process and a power control parameter indication process, and reduce signaling overheads. The method and apparatus may be applied to a 5G communication system and a future communication system. The method includes: A terminal device receives, from a network device, first signaling that includes a first value of a DCI field, where the first value indicates a first TCI state in at least one activated TCI state; and obtains, based on a mapping relationship, a power control parameter set corresponding to the first TCI state. The mapping relationship includes a mapping relationship between an identifier of at least one mapping parameter subset and at least one value of the DCI field, or a mapping relationship between an identifier of at least one mapping parameter subset and the at least one activated TCI state.

17 Claims, 15 Drawing Sheets

(56) References Cited

U.S. PATENT DOCUMENTS

| 2024/0251358 | A1 * | 7/2024 | Zhou | H04W 52/242 |
| 2024/0259950 | A1 * | 8/2024 | Nilsson | H04W 52/42 |

OTHER PUBLICATIONS

ZTE:"Enhancements on Multi-beam Operation".3GPP TSG RAN WG1 Meeting #104-e, e-Meeting, Jan. 25-Feb. 5, 2021, R1-2100285, total 21 pages.
MediaTek Inc:"Enhancement on multi-beam operation".3GPP TSG RAN WG1 #104-e, e-Meeting, Jan. 25-Feb. 5, 2021, R1-2100588, total 27 pages.

* cited by examiner

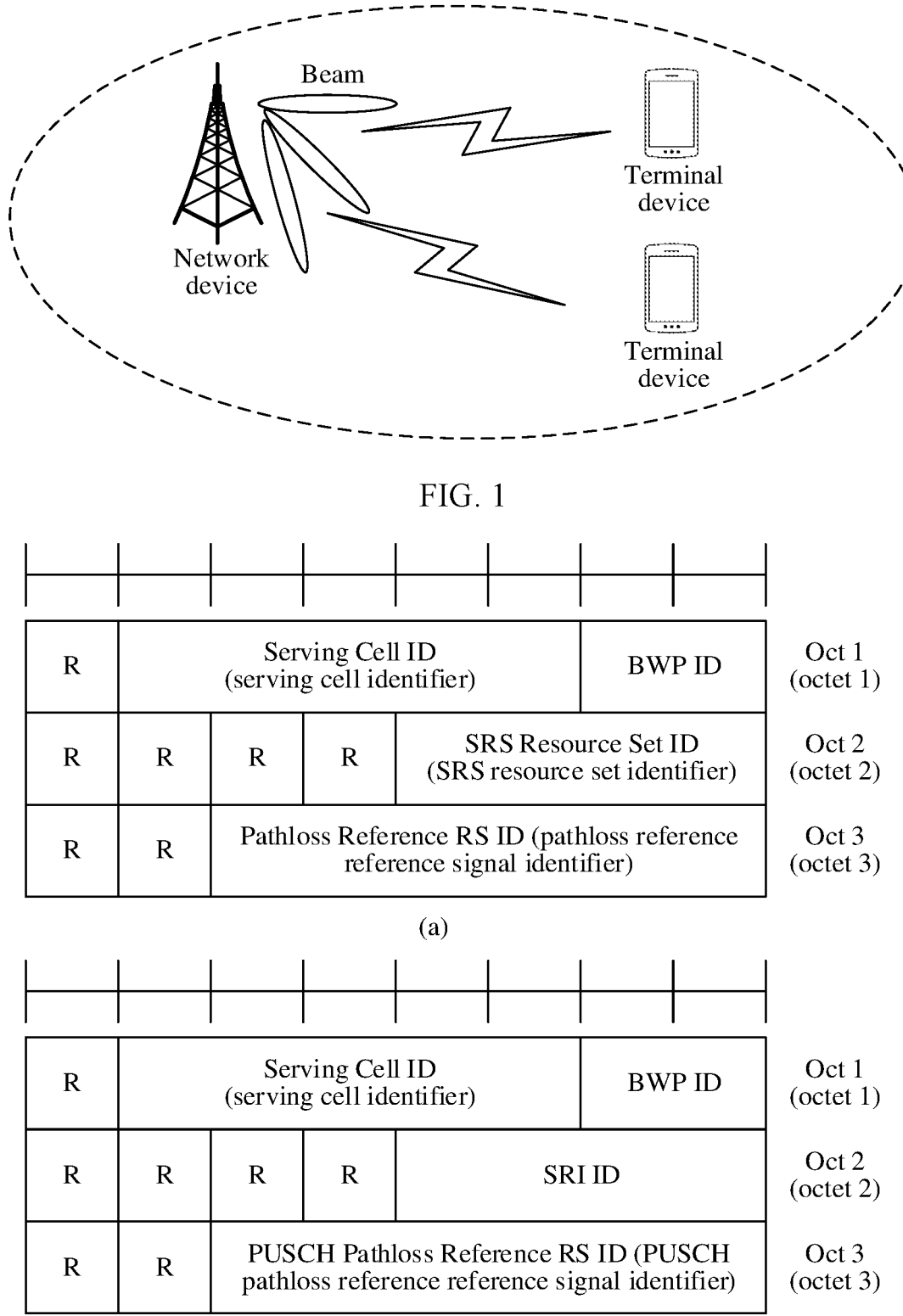

FIG. 1

| R | Serving Cell ID (serving cell identifier) | | | BWP ID | | Oct 1 (octet 1) |
|---|---|---|---|---|---|---|
| R | R | R | R | SRS Resource Set ID (SRS resource set identifier) | | Oct 2 (octet 2) |
| R | R | Pathloss Reference RS ID (pathloss reference reference signal identifier) | | | | Oct 3 (octet 3) |

(a)

| R | Serving Cell ID (serving cell identifier) | | | BWP ID | | Oct 1 (octet 1) |
|---|---|---|---|---|---|---|
| R | R | R | R | SRI ID | | Oct 2 (octet 2) |
| R | R | PUSCH Pathloss Reference RS ID (PUSCH pathloss reference reference signal identifier) | | | | Oct 3 (octet 3) |

| | Oct 1 (octet 1) | Oct 2 (octet 2) | Oct 3 (octet 3) | | Oct N (octet N) |
|---|---|---|---|---|---|
| CORESET Pool ID (control resource set identifier) | | | | | |
| Serving Cell ID (serving cell identifier) | | | | | |
| BWP ID | | | | | |

TCI state

| T7 | T6 | T5 | T4 | T3 | T2 | T1 | T0 |
|---|---|---|---|---|---|---|---|
| T15 | T14 | T13 | T12 | T11 | T10 | T9 | T8 |
| T(N−2)*8+7 | T(N−2)*8+6 | T(N−2)*8+5 | T(N−2)*8+4 | T(N−2)*8+3 | T(N−2)*8+2 | T(N−2)*8+1 | T(N−2)*8+0 |

DCI field

| Codepoint 1 | Codepoint 2 | Codepoint 3 | Codepoint 4 | Codepoint 5 | Codepoint 6 | Codepoint 7 | Codepoint 8 |
|---|---|---|---|---|---|---|---|
| 000 | 001 | 010 | 011 | 100 | 101 | 110 | 111 |
| Parameter subset 1 | Parameter subset 2 | Parameter subset 3 | Parameter subset 4 | Parameter subset 5 | Parameter subset 6 | Parameter subset 7 | Parameter subset 8 |
| Parameter subset 9 | Parameter subset 10 | Parameter subset 11 | Parameter subset 12 | Parameter subset 13 | Parameter subset 14 | Parameter subset 15 | Parameter subset 16 |
| Parameter subset 17 | Parameter subset 18 | Parameter subset 19 | Parameter subset 20 | Parameter subset 21 | Parameter subset 22 | Parameter subset 23 | Parameter subset 24 |

Parameter set

FIG. 5

| | | | | | | | | |
|---|---|---|---|---|---|---|---|---|
| CORESET Pool ID (control resource set identifier) | Serving Cell ID (serving cell identifier) | | | | | | BWP ID | Oct 1 (octet 1) |
| T7 | T6 | T5 | T4 | T3 | T2 | T1 | T0 | Oct 2 (octet 2) |
| T15 | T14 | T13 | T12 | T11 | T10 | T9 | T8 | Oct 3 (octet 3) |
| ⋮ | | | | | | | | |
| T(N–2)*8+7 | T(N–2)*8+6 | T(N–2)*8+5 | T(N–2)*8+4 | T(N–2)*8+3 | T(N–2)*8+2 | T(N–2)*8+1 | T(N–2)*8+0 | Oct N (octet N) |

TCI state

| DCI field | Codepoint 1 | Codepoint 2 | Codepoint 3 | Codepoint 4 | Codepoint 5 | Codepoint 6 | Codepoint 7 | Codepoint 8 |
|---|---|---|---|---|---|---|---|---|
| | 000 | 001 | 010 | 011 | 100 | 101 | 110 | 111 |
| | Parameter subset 1a | Parameter subset 2a | Parameter subset 3a | Parameter subset 4a | Parameter subset 5a | Parameter subset 6a | Parameter subset 7a | Parameter subset 8a |
| | Parameter subset 9a | Parameter subset 10a | Parameter subset 11a | Parameter subset 12a | Parameter subset 13a | Parameter subset 14a | Parameter subset 15a | Parameter subset 16a |
| | Parameter subset 1b | Parameter subset 2b | Parameter subset 3b | Parameter subset 4b | Parameter subset 5b | Parameter subset 6b | Parameter subset 7b | Parameter subset 8b |
| | Parameter subset 9b | Parameter subset 10b | Parameter subset 11b | Parameter subset 12b | Parameter subset 13b | Parameter subset 14b | Parameter subset 15b | Parameter subset 16b |

Parameter set 1    Parameter set 2

Figure 7:
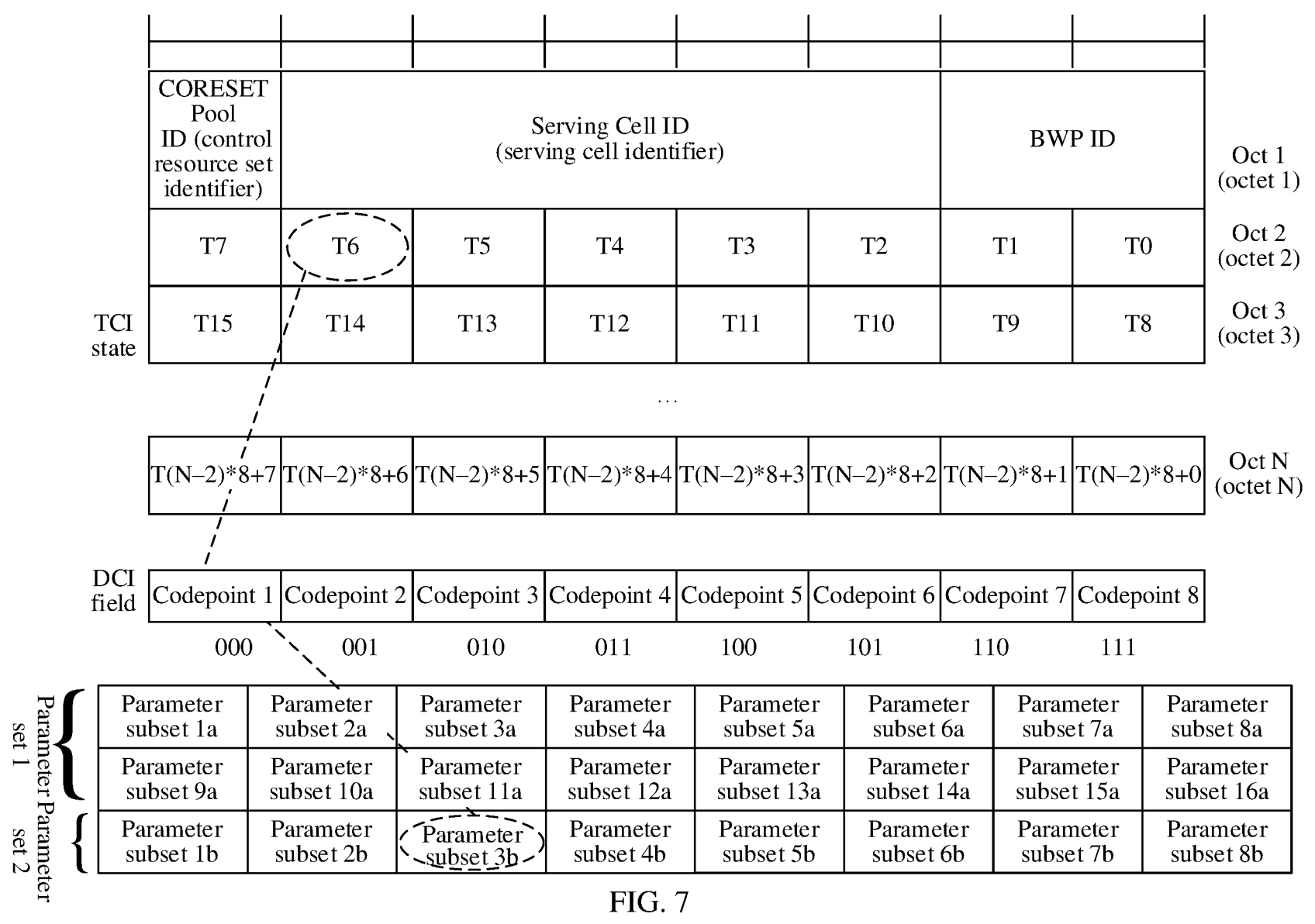

| | Oct 1 (octet 1) | Oct 2 (octet 2) | Oct 3 (octet 3) | | Oct N (octet N) |
|---|---|---|---|---|---|
| CORESET Pool ID (control resource set identifier) | Serving Cell ID (serving cell identifier) | | BWP ID | | |

TCI state

| | | | | | | | |
|---|---|---|---|---|---|---|---|
| T7 | T6 | T5 | T4 | T3 | T2 | T1 | T0 |
| T15 | T14 | T13 | T12 | T11 | T10 | T9 | T8 |

...

| T(N−2)*8+7 | T(N−2)*8+6 | T(N−2)*8+5 | T(N−2)*8+4 | T(N−2)*8+3 | T(N−2)*8+2 | T(N−2)*8+1 | T(N−2)*8+0 |

DCI field

| Codepoint 1 | Codepoint 2 | Codepoint 3 | Codepoint 4 | Codepoint 5 | Codepoint 6 | Codepoint 7 | Codepoint 8 |
|---|---|---|---|---|---|---|---|
| 000 | 001 | 010 | 011 | 100 | 101 | 110 | 111 |

| Parameter subset 1a | Parameter subset 2a | Parameter subset 3a | Parameter subset 4a | Parameter subset 5a | Parameter subset 6a | Parameter subset 7a | Parameter subset 8a |
|---|---|---|---|---|---|---|---|
| Parameter subset 9a | Parameter subset 10a | Parameter subset 11a | Parameter subset 12a | Parameter subset 13a | Parameter subset 14a | Parameter subset 15a | Parameter subset 16a |
| Parameter subset 1b | Parameter subset 2b | Parameter subset 3b | Parameter subset 4b | Parameter subset 5b | Parameter subset 6b | Parameter subset 7b | Parameter subset 8b |

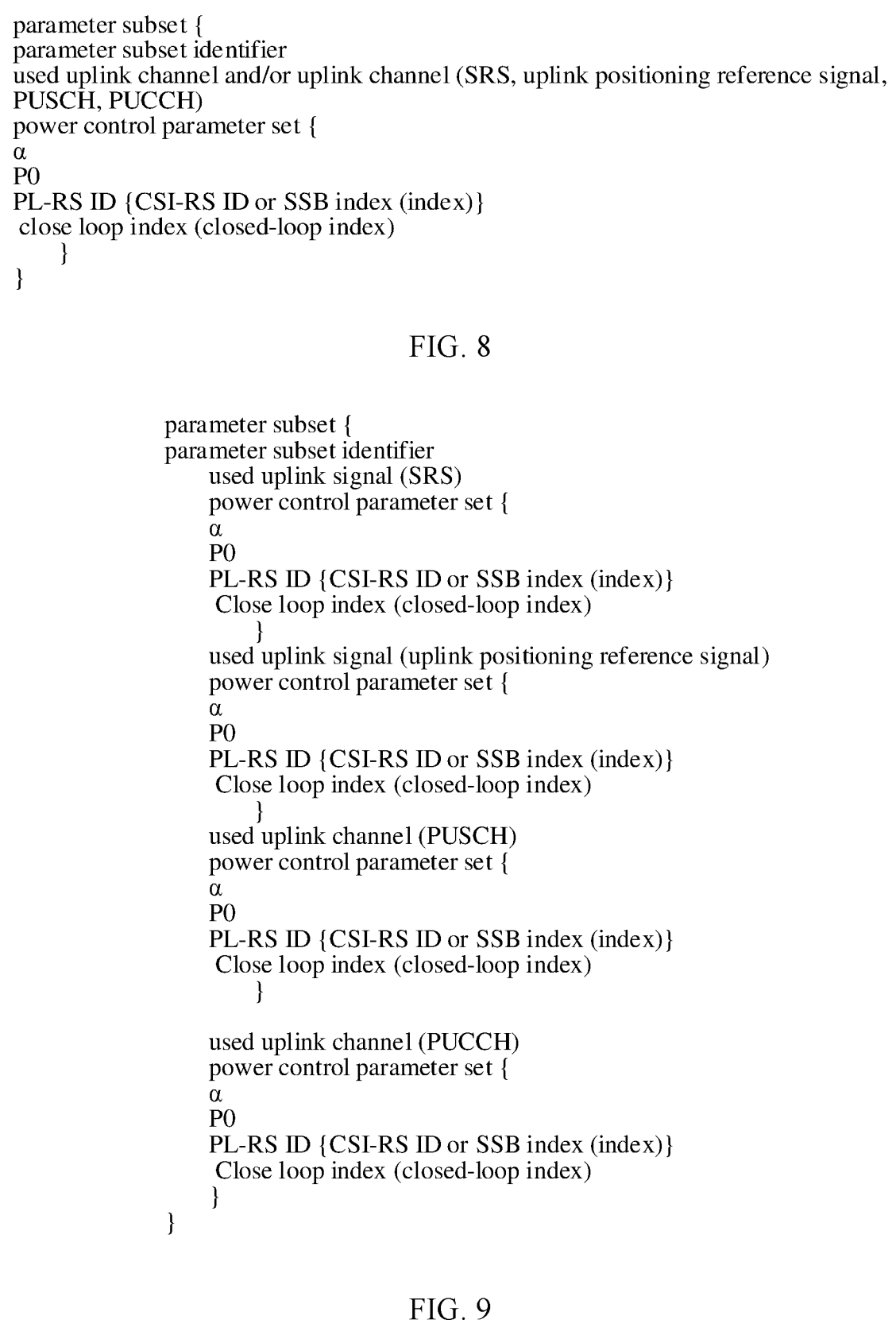

Parameter set 1    Parameter set 2 parameter subset {
parameter subset identifier
used uplink channel and/or uplink channel (SRS, uplink positioning reference signal,
PUSCH, PUCCH)
power control parameter set {
α
P0
PL-RS ID {CSI-RS ID or SSB index (index)}
 close loop index (closed-loop index)
      }
}

FIG. 8 parameter subset {
parameter subset identifier
      used uplink signal (SRS)
      power control parameter set {
      α
      P0
      PL-RS ID {CSI-RS ID or SSB index (index)}
       Close loop index (closed-loop index)
           }
      used uplink signal (uplink positioning reference signal)
      power control parameter set {
      α
      P0
      PL-RS ID {CSI-RS ID or SSB index (index)}
       Close loop index (closed-loop index)
           }
      used uplink channel (PUSCH)
      power control parameter set {
      α
      P0
      PL-RS ID {CSI-RS ID or SSB index (index)}
       Close loop index (closed-loop index)
           } used uplink channel (PUCCH)
      power control parameter set {
      α
      P0
      PL-RS ID {CSI-RS ID or SSB index (index)}
       Close loop index (closed-loop index)
      }
    }

FIG. 9

```
parameter subset {
parameter subset identifier
      used uplink signal (SRS, uplink positioning reference signal)
      power control parameter set {
      α
      P0
      PL-RS ID {CSI-RS ID or SSB index (index)}
       Close loop index (closed-loop index)
             }
      used uplink channel (PUSCH, PUCCH)
      power control parameter set {
      α
      P0
      PL-RS ID {CSI-RS ID or SSB index (index)}
       Close loop index (closed-loop index)
             }
}
```

FIG. 10

| Parameter subset 1a | Parameter subset 2a | Parameter subset 3a | Parameter subset 4a | Parameter subset 5a | Parameter subset 6a | Parameter subset 7a | Parameter subset 8a |
|---|---|---|---|---|---|---|---|
| Parameter subset 9a | Parameter subset 10a | Parameter subset 11a | Parameter subset 12a | Parameter subset 13a | Parameter subset 14a | Parameter subset 15a | Parameter subset 16a |
| Parameter subset 1b | Parameter subset 2b | Parameter subset 3b | Parameter subset 4b | Parameter subset 5b | Parameter subset 6b | Parameter subset 7b | Parameter subset 8b |

Parameter set 1    Parameter set 2

|  | | | | | | | | | Oct 1 (octet 1) |
|---|---|---|---|---|---|---|---|---|---|
| CORESET Pool ID (control resource set identifier) | Serving Cell ID (serving cell identifier) | | | | | | BWP ID | | |

TCI state:

|  | | | | | | | | |
|---|---|---|---|---|---|---|---|---|
| T7 | T6 | T5 | T4 | T3 | T2 | T1 | T0 | Oct 1 (octet 1) |
| T15 | T14 | T13 | T12 | T11 | T10 | T9 | T8 | Oct 2 (octet 2) |
| | | | | | | | | Oct 3 (octet 3) |
| T(N−2)*8+7 | T(N−2)*8+6 | T(N−2)*8+5 | T(N−2)*8+4 | T(N−2)*8+3 | T(N−2)*8+2 | T(N−2)*8+1 | T(N−2)*8+0 | Oct N (octet N) |

...

DCI field:

| Codepoint 1 | Codepoint 2 | Codepoint 3 | Codepoint 4 | Codepoint 5 | Codepoint 6 | Codepoint 7 | Codepoint 8 |
|---|---|---|---|---|---|---|---|
| 000 | 001 | 010 | 011 | 100 | 101 | 110 | 111 |

FIG. 13

POWER CONTROL PARAMETER DETERMINING METHOD AND APPARATUS

CROSS-REFERENCE TO RELATED APPLICATIONS

This application is a continuation of International Application No. PCT/CN2022/084612, filed on Mar. 31, 2022, which claims priority to Chinese Patent Application No. 202110369437.2, filed on Apr. 6, 2021. The disclosures of the aforementioned applications are hereby incorporated by reference in their entireties.

TECHNICAL FIELD

This application relates to the communication field, and in particular, to a power control parameter determining method and an apparatus.

BACKGROUND

A beam is a communication resource, and a network device and a terminal device may communicate with each other by using the beam. In an uplink scenario, the terminal device may send an uplink signal or an uplink channel to the network device by using an uplink beam. To successfully send the uplink signal or the uplink channel, the terminal device needs to perform uplink power control. For example, the terminal device needs to determine transmit power of the uplink signal or the uplink channel by using a power control parameter from the network device, so that power of the sent uplink signal or uplink channel arriving at the network device meets nominal power P0. The nominal power is power that the network device expects the uplink signal or the uplink channel to reach when the uplink signal or the uplink channel arrives at the network device.

Different uplink beams are sent by using different modulation methods and different code rates, and are corresponding to different uplink coverage targets. Therefore, switching an uplink beam causes a change of a power control parameter. To be specific, after sending a beam indicator to the terminal device, the network device further needs to send a corresponding power control parameter indicator used for uplink power control. In addition, power control is performed for different uplink signals or uplink channels by correspondingly using different power control parameters. As a result, a complex process needs to be performed to exchange the beam indicator and the power control parameter indicator between the network device and the terminal device, and signaling overheads are high.

SUMMARY

This application provides a power control parameter determining method and an apparatus, to simplify a beam indication process and a power control parameter indication process, and reduce signaling overheads.

To achieve the foregoing objectives, the following technical solutions are used in this application.

According to a first aspect, a power control parameter determining method is provided. The power control parameter determining method includes: receiving first signaling from a network device, and determining, based on a mapping relationship, a first mapping parameter subset corresponding to a first transmission configuration indicator (TCI) state. The first signaling includes a first value of a downlink control information (DCI) field, and the first value indicates the first TCI state in at least one activated TCI state. The mapping relationship includes a mapping relationship between an identifier of at least one mapping parameter subset and at least one value of the DCI field, or a mapping relationship between an identifier of at least one mapping parameter subset and the at least one activated TCI state. The first mapping parameter subset is one of the at least one mapping parameter subset, each of the at least one mapping parameter subset includes at least one uplink signal and/or at least one uplink channel and a corresponding power control parameter set, the power control parameter set includes at least one power control parameter, and the first value is one of the at least one value of the DCI field.

In some implementations, the first signaling may be DCI, and a first value of the DCI may indicate the first TCI state in the at least one activated TCI state.

Based on the power control parameter determining method according to the first aspect, a terminal device receives, from the network device, the first signaling that includes the first value of the DCI field, where the first value indicates the first TCI state in the at least one activated TCI state. The terminal device may determine, based on the mapping relationship between the identifier of the at least one mapping parameter subset and the at least one value of the DCI field, that a mapping parameter subset to which the first value is mapped is the first mapping parameter subset corresponding to the first TCI state. Alternatively, the terminal device may determine, based on the mapping relationship between the identifier of the at least one mapping parameter subset and the at least one activated TCI state, the first mapping parameter subset corresponding to the first TCI state. In this way, after receiving the first signaling that indicates the first TCI state, the terminal device may obtain, based on the mapping relationship, the power control parameter set corresponding to the first TCI state. A power control parameter indicator does not need to be exchanged between the terminal device and the network device, so that signaling overheads can be reduced.

In addition, in this application, at least one uplink signal and/or at least one uplink channel and at least one corresponding power control parameter are indicated by using a parameter subset, so that power control parameters can be simply indicated in a unified manner for different uplink transmission scenarios, thereby further reducing signaling overheads.

In a possible design, an $m^{th}$ mapping parameter subset in the at least one mapping parameter subset may correspond to an $m^{th}$ value of the DCI field. Herein, m is an ordinal position (ordinal position) of the mapping parameter subset in the at least one mapping parameter subset, or m is an activation ranking of the mapping parameter subset in the at least one mapping parameter subset. m is an integer greater than 0. In this way, the terminal device may determine, based on a mapping relationship between the $m^{th}$ mapping parameter subset and the $m^{th}$ value of the DCI field, the first mapping parameter subset corresponding to the first TCI state, so that signaling overheads can be reduced.

Optionally, the at least one mapping parameter subset may be in a one-to-one correspondence with the at least one value of the DCI field.

Optionally, values of the DCI field may be sorted in ascending order, and an $(m+1)^{th}$ value is greater than the $m^{th}$ value. Alternatively, optionally, values of the DCI field may be sorted in descending order, and an $(m+1)^{th}$ value is less than the $m^{th}$ value.

Optionally, a value (or referred to as a codepoint) to which a mapping parameter subset is mapped may be determined by an ordinal position of the mapping parameter subset in all the at least one mapping parameter subset. Alternatively, a value to which a mapping parameter subset is mapped may be determined by an activation ranking of the mapping parameter subset in all the at least one mapping parameter subset.

In a possible design, a $q^{th}$ mapping parameter subset in the at least one mapping parameter subset may correspond to a $q^{th}$ activated TCI state in the at least one activated TCI state. Herein, q is an ordinal position of the mapping parameter subset in the at least one mapping parameter subset and an ordinal position of the TCI state in the at least one activated TCI state, and q is an integer greater than 0. In this way, the terminal device may determine, based on a mapping relationship between the $q^{th}$ mapping parameter subset and the $q^{th}$ activated TCI state, the first mapping parameter subset corresponding to the first TCI state, so that signaling overheads can be reduced.

Optionally, the at least one mapping parameter subset may be in a one-to-one correspondence with the at least one activated TCI state.

Optionally, an activated TCI state to which a mapping parameter subset is mapped is determined by an ordinal position of the mapping parameter subset in all the at least one mapping parameter subset and an ordinal position of the activated TCI state in all activated TCI states.

Alternatively, optionally, an activated TCI state to which a mapping parameter subset is mapped is determined by an activation ranking of the mapping parameter subset in all the at least one mapping parameter subset and an activation ranking of the activated TCI state in all activated TCI states.

In a possible design, the power control parameter determining method provided in the first aspect may further include: receiving second signaling from the network device. The second signaling may include at least one parameter set, each of the at least one parameter set may include at least one parameter subset, each of the at least one parameter subset may include at least one uplink signal and/or at least one uplink channel and a corresponding power control parameter set, and the power control parameter set includes at least one power control parameter.

Optionally, the second signaling may be radio resource control (RRC) signaling. In other words, the parameter set may be preconfigured by the network device by using the RRC signaling.

In a possible design, the power control parameter determining method provided in the first aspect may further include: receiving third signaling from the network device. The third signaling may be used to activate one or more parameter subsets in the at least one parameter subset, and the at least one mapping parameter subset is an activated parameter subset in the at least one parameter set.

Optionally, the third signaling may be medium access control (MAC) control element (CE) signaling. In this way, flexible association between a parameter subset and a TCI state can be implemented based on the MAC CE signaling, to reduce signaling overheads.

In a possible design, the at least one mapping parameter subset may be in a one-to-one correspondence with the at least one parameter set, and each of the at least one parameter set includes one mapping parameter subset.

In a possible design, there is one power control parameter set, and the at least one uplink signal and/or the at least one uplink channel are/is corresponding to the one power control parameter set. In other words, one power control parameter set may be configured for an SRS, an uplink positioning reference signal, a physical uplink shared channel (PUSCH), and a physical uplink control channel (PUCCH), and configuration is flexible and simple.

In a possible design, there is at least one power control parameter set, and the at least one uplink signal and/or the at least one uplink channel are/is in a one-to-one correspondence with the at least one power control parameter set. For example, a power control parameter set may be separately configured for each uplink signal and each uplink channel. Configuration is flexible and simple, and different requirements in different transmission scenarios can be met.

In a possible design, when each of the at least one mapping parameter subset includes the at least one uplink channel and the corresponding power control parameter set, the power control parameter determining method provided in the first aspect may further include: determining, based on a parameter offset set and the first mapping parameter subset, a first power control parameter set corresponding to the at least one uplink signal. The first power control parameter set includes the at least one power control parameter, and the parameter offset set includes the at least one uplink signal and a corresponding offset of the at least one power control parameter.

Therefore, the terminal device may determine, based on the first mapping parameter subset corresponding to the uplink channel and the offset of the at least one power control parameter, the at least one power control parameter corresponding to the uplink signal and/or the uplink channel. In this way, differentiated power control parameter indication can be implemented without increasing complexity of power control parameter indication, and this may be applied to different uplink transmission scenarios.

In a possible design, the offset of the at least one power control parameter may include one or more of the following: an offset of nominal power, an offset of a pathloss, and an offset of a pathloss compensation factor.

In a possible design, the at least one power control parameter may include one or more of the following: the nominal power, the pathloss compensation factor, a pathloss reference signal identifier, and a closed-loop index.

Optionally, the pathloss reference signal identifier may include but is not limited to one or more of the following: a channel state information reference signal identifier (CSI-RS ID) or a synchronization signal block index (SSB index).

In a possible design, the at least one uplink channel may include a physical uplink shared channel PUSCH and/or a physical uplink control channel PUCCH, and the at least one uplink signal may include an uplink sounding reference signal SRS and/or an uplink positioning reference signal.

In a possible design, the power control parameter determining method provided in the first aspect may further include: sending the uplink signal and/or the uplink channel to the network device by using at least one power control parameter in the first mapping parameter subset. In this way, a transmission rate of the uplink signal and/or the uplink channel can be improved.

Optionally, the terminal device may determine transmit power of the uplink signal and/or the uplink channel by using the at least one power control parameter in the first mapping parameter subset.

According to a second aspect, a power control parameter determining method is provided. The power control parameter determining method includes: determining at least one parameter set, and sending second signaling to a terminal device. Each of the at least one parameter set includes at least one parameter subset, each of the at least one parameter subset includes at least one uplink signal and/or at least one uplink channel and a corresponding power control parameter set, the power control parameter set includes at least one power control parameter, and the second signaling includes the at least one parameter set.

In a possible design, the power control parameter determining method provided in the second aspect may further include: sending third signaling to the terminal device. The third signaling is used to activate one or more parameter subsets in the at least one parameter subset, and at least one mapping parameter subset is an activated parameter subset in the at least one parameter set.

In a possible design, the at least one mapping parameter subset may be in a one-to-one correspondence with the at least one parameter set, and each of the at least one parameter set may include one mapping parameter subset.

In a possible design, there is one power control parameter set, and the at least one uplink signal and/or the at least one uplink channel are/is corresponding to the one power control parameter set.

In a possible design, there is at least one power control parameter set, and the at least one uplink signal and/or the at least one uplink channel are/is in a one-to-one correspondence with the at least one power control parameter set.

In a possible design, the at least one power control parameter may include one or more of the following: nominal power, a pathloss compensation factor, a pathloss reference signal identifier, and a closed-loop index.

In a possible design, the at least one uplink channel includes a physical uplink shared channel PUSCH and/or a physical uplink control channel PUCCH, and the at least one uplink signal includes an uplink sounding reference signal SRS and/or an uplink positioning reference signal.

In a possible design, the power control parameter determining method provided in the second aspect may further include: sending first signaling to the terminal device. The first signaling includes a first value of a DCI field, and the first value indicates a first transmission configuration indicator TCI state in at least one activated TCI state.

In some implementations, the first signaling may be DCI, and a first value of the DCI may indicate the first TCI state in the at least one activated TCI state.

In addition, for technical effects of the power control parameter determining method in the second aspect, refer to the technical effects of the power control parameter determining method in the first aspect. Details are not described herein again.

According to a third aspect, a power control parameter determining method is provided. The power control parameter determining method includes: receiving downlink signaling from a network device, and determining, based on a parameter offset set and a power control parameter set, a first power control parameter set corresponding to an uplink signal and/or an uplink channel. The downlink signaling indicates a TCI state, the TCI state corresponds to the power control parameter set, the power control parameter set includes at least one power control parameter, and the parameter offset set includes the uplink signal and/or the uplink channel and a corresponding offset of the at least one power control parameter.

Based on the power control parameter determining method provided in the third aspect, a terminal device may determine, based on the power control parameter set corresponding to the TCI state and the offset of the at least one power control parameter, the at least one power control parameter corresponding to the uplink signal and/or the uplink channel. In this way, differentiated power control parameter indication can be implemented without increasing complexity of power control parameter indication, and this may be applied to different uplink transmission scenarios.

In a possible design, the offset of the at least one power control parameter may include one or more of the following: an offset of nominal power, an offset of a pathloss, and an offset of a pathloss compensation factor.

In a possible design, the at least one power control parameter may include one or more of the following: the nominal power, the pathloss compensation factor, a pathloss reference signal identifier, and a closed-loop index.

In a possible design, the uplink signal may include an uplink sounding reference signal SRS and/or an uplink positioning reference signal, and the uplink channel may include a physical uplink shared channel PUSCH and/or a physical uplink control channel PUCCH.

In a possible design, the power control parameter in the power control parameter set is associated with the uplink signal or the uplink channel. In other words, the power control parameter set corresponding to the TCI state may be associated with the uplink signal or the uplink channel.

For example, the first power control parameter set corresponding to the uplink channel may be determined based on the parameter offset set and the power control parameter set associated with the uplink signal. For another example, the first power control parameter set corresponding to the uplink signal may be determined based on the parameter offset set and the power control parameter set associated with the uplink channel. For another example, a first power control parameter set corresponding to a PUCCH may be determined based on the parameter offset set and a power control parameter set associated with a PUSCH.

In a possible design, the power control parameter determining method provided in the third aspect may further include: receiving the parameter offset set from the network device.

Optionally, the parameter offset set may be preconfigured by using RRC signaling.

In a possible design, the power control parameter determining method provided in the third aspect may further include: receiving priority information from the network device. The priority information indicates a priority of the power control parameter set corresponding to the TCI state.

Optionally, the priority information may indicate that the priority of the power control parameter set corresponding to the TCI state is the lowest, or indicate that the priority of the power control parameter set corresponding to the TCI state is lower than that of a power control parameter set corresponding to an SRI indicator.

If both a power control parameter corresponding to an uplink sounding reference signal resource index (SRI) indicator and the power control parameter set corresponding to the TCI state exist, the terminal device may preferentially determine transmit power of a PUSCH by using the power control parameter corresponding to the SRI indicator, to send the PUSCH.

In a possible design, there are one or more parameter offset sets. The method provided in this embodiment of this application is applicable to a scenario of communication between a terminal device and a plurality of network devices (which may be referred to as multiple Tx-Rx point (mTRP)).

According to a fourth aspect, a power control parameter determining method is provided. The power control parameter determining method includes: determining a parameter offset set, and sending the parameter offset set to a terminal device. The parameter offset set includes an uplink signal and/or an uplink channel and a corresponding offset of at least one power control parameter.

In a possible design, the offset of the at least one power control parameter may include one or more of the following: an offset of nominal power, an offset of a pathloss, and an offset of a pathloss compensation factor.

In a possible design, the at least one power control parameter may include one or more of the following: the nominal power, the pathloss compensation factor, a pathloss reference signal identifier, and a closed-loop index.

In a possible design, the uplink signal may include an uplink sounding reference signal SRS and/or an uplink positioning reference signal, and the uplink channel may include a physical uplink shared channel PUSCH and/or a physical uplink control channel PUCCH.

In a possible design, the power control parameter determining method provided in the fourth aspect may further include: sending downlink signaling to the terminal device. The downlink signaling indicates a TCI state, the TCI state corresponds to a power control parameter set, and the power control parameter set includes the at least one power control parameter.

In a possible design, the power control parameter in the power control parameter set is associated with the uplink signal or the uplink channel.

In a possible design, the power control parameter determining method provided in the fourth aspect may further include: sending priority information to the terminal device. The priority information indicates a priority of the power control parameter set corresponding to the TCI state.

In a possible design, there are one or more parameter offset sets.

In addition, for technical effects of the power control parameter determining method in the fourth aspect, refer to the technical effects of the power control parameter determining method in the third aspect. Details are not described herein again.

According to a fifth aspect, a power control parameter determining apparatus is provided. The power control parameter determining apparatus includes a transceiver module and a processing module.

The transceiver module is configured to receive first signaling from a network device. The first signaling includes a first value of a DCI field, and the first value indicates a first transmission configuration indicator TCI state in at least one activated TCI state.

The processing module is configured to determine, based on a mapping relationship, a first mapping parameter subset corresponding to the first TCI state. The mapping relationship includes a mapping relationship between an identifier of at least one mapping parameter subset and at least one value of the DCI field, or a mapping relationship between an identifier of at least one mapping parameter subset and the at least one activated TCI state. The first mapping parameter subset is one of the at least one mapping parameter subset, each of the at least one mapping parameter subset includes at least one uplink signal and/or at least one uplink channel and a corresponding power control parameter set, the power control parameter set includes at least one power control parameter, and the first value is one of the at least one value of the DCI field.

In a possible design, an $m^{th}$ mapping parameter subset in the at least one mapping parameter subset may correspond to an $m^{th}$ value of the DCI field. Herein, m is an ordinal position of the mapping parameter subset in the at least one mapping parameter subset, and m is an integer greater than 0.

In a possible design, a $q^{th}$ mapping parameter subset in the at least one mapping parameter subset may correspond to a $q^{th}$ activated TCI state in the at least one activated TCI state. Herein, q is an ordinal position of the mapping parameter subset in the at least one mapping parameter subset and an ordinal position of the TCI state in the at least one activated TCI state, and q is an integer greater than 0.

In a possible design, the transceiver module is further configured to receive second signaling from the network device. The second signaling may include at least one parameter set, each of the at least one parameter set may include at least one parameter subset, each of the at least one parameter subset may include at least one uplink signal and/or at least one uplink channel and a corresponding power control parameter set, and the power control parameter set includes at least one power control parameter.

In a possible design, the transceiver module is further configured to receive third signaling from the network device. The third signaling is used to activate one or more parameter subsets in the at least one parameter subset, and at least one mapping parameter subset is an activated parameter subset in the at least one parameter set.

In a possible design, the at least one mapping parameter subset may be in a one-to-one correspondence with the at least one parameter set, and each of the at least one parameter set may include one mapping parameter subset.

In a possible design, there is one power control parameter set, and the at least one uplink signal and/or the at least one uplink channel are/is corresponding to the one power control parameter set.

In a possible design, there is at least one power control parameter set, and the at least one uplink signal and/or the at least one uplink channel may be in a one-to-one correspondence with the at least one power control parameter set.

In a possible design, when each of the at least one mapping parameter subset may include the at least one uplink channel and the corresponding power control parameter set, the processing module is further configured to determine, based on a parameter offset set and the first mapping parameter subset, a first power control parameter set corresponding to the at least one uplink signal. The first power control parameter set may include the at least one power control parameter, and the parameter offset set may include the at least one uplink signal and a corresponding offset of the at least one power control parameter.

In a possible design, the offset of the at least one power control parameter may include one or more of the following: an offset of nominal power, an offset of a pathloss, and an offset of a pathloss compensation factor.

In a possible design, the at least one power control parameter may include one or more of the following: the nominal power, the pathloss compensation factor, a pathloss reference signal identifier, and a closed-loop index.

In a possible design, the at least one uplink channel may include a physical uplink shared channel PUSCH and/or a physical uplink control channel PUCCH, and the at least one uplink signal includes an uplink sounding reference signal SRS and/or an uplink positioning reference signal.

In a possible design, the transceiver module is further configured to send the uplink signal and/or the uplink channel to the network device. In this way, a transmission rate of the uplink signal and/or the uplink channel can be improved.

Optionally, the processing module is further configured to determine transmit power of the uplink signal and/or the uplink channel by using the at least one power control parameter in the first mapping parameter subset.

It should be noted that, the transceiver module in the fifth aspect may include a receiving module and a sending module. The receiving module is configured to receive data and/or signaling from the network device. The sending module is configured to send data and/or signaling to the network device. A specific implementation of the transceiver module is not specifically limited in this application.

Optionally, the power control parameter determining apparatus in the fifth aspect may further include a storage module, and the storage module stores a program or instructions. When the processing module executes the program or the instructions, the power control parameter determining apparatus in the fifth aspect is enabled to perform the method according to the first aspect.

It should be noted that, the power control parameter determining apparatus in the fifth aspect may be a terminal device, or may be a chip (system) or another part or component that can be disposed in the terminal device. This is not limited in this application.

In addition, for technical effects of the power control parameter determining apparatus in the fifth aspect, refer to the technical effects of the power control parameter determining method according to any possible implementation of the first aspect. Details are not described herein again.

According to a sixth aspect, a power control parameter determining apparatus is provided. The power control parameter determining apparatus includes a transceiver module and a processing module.

The processing module is configured to determine at least one parameter set. Each of the at least one parameter set includes at least one parameter subset, each of the at least one parameter subset includes at least one uplink signal and/or at least one uplink channel and a corresponding power control parameter set, and the power control parameter set includes at least one power control parameter.

The transceiver module is configured to send second signaling to a terminal device. The second signaling includes the at least one parameter set.

In a possible design, the transceiver module is further configured to send third signaling to the terminal device. The third signaling is used to activate one or more parameter subsets in the at least one parameter subset, and at least one mapping parameter subset is an activated parameter subset in the at least one parameter set.

In a possible design, the at least one mapping parameter subset may be in a one-to-one correspondence with the at least one parameter set, and each of the at least one parameter set includes one mapping parameter subset.

In a possible design, there is one power control parameter set, and the at least one uplink signal and/or the at least one uplink channel are/is corresponding to the one power control parameter set.

In a possible design, there is at least one power control parameter set, and the at least one uplink signal and/or the at least one uplink channel are/is in a one-to-one correspondence with the at least one power control parameter set.

In a possible design, the at least one power control parameter may include one or more of the following: nominal power, a pathloss compensation factor, a pathloss reference signal identifier, and a closed-loop index.

In a possible design, the at least one uplink channel may include a physical uplink shared channel PUSCH and/or a physical uplink control channel PUCCH, and the at least one uplink signal may include an uplink sounding reference signal SRS and/or an uplink positioning reference signal.

In a possible design, the transceiver module is further configured to send first signaling to the terminal device. The first signaling may include a first value of a DCI field, and the first value may indicate a first transmission configuration indicator TCI state in at least one activated TCI state.

It should be noted that, the transceiver module in the sixth aspect may include a receiving module and a sending module. The receiving module is configured to receive data and/or signaling from the terminal device. The sending module is configured to send data and/or signaling to the terminal device. A specific implementation of the transceiver module is not specifically limited in this application.

Optionally, the power control parameter determining apparatus in the sixth aspect may further include a storage module, and the storage module stores a program or instructions. When the processing module executes the program or the instructions, the power control parameter determining apparatus in the sixth aspect is enabled to perform the method according to the second aspect.

It should be noted that, the power control parameter determining apparatus in the sixth aspect may be a network device, or may be a chip (system) or another part or component that can be disposed in the network device. This is not limited in this application.

In addition, for technical effects of the power control parameter determining apparatus in the sixth aspect, refer to the technical effects of the power control parameter determining method according to any possible implementation of the first aspect. Details are not described herein again.

According to a seventh aspect, a power control parameter determining apparatus is provided. The power control parameter determining apparatus includes a transceiver module and a processing module.

The transceiver module is configured to receive downlink signaling from a network device. The downlink signaling indicates a TCI state, the TCI state corresponds to a power control parameter set, and the power control parameter set includes the at least one power control parameter.

The processing module is configured to determine, based on a parameter offset set and the power control parameter set, a first power control parameter set corresponding to an uplink signal and/or an uplink channel. The parameter offset set includes the uplink signal and/or the uplink channel and a corresponding offset of the at least one power control parameter.

In a possible design, the offset of the at least one power control parameter may include one or more of the following: an offset of nominal power, an offset of a pathloss, and an offset of a pathloss compensation factor.

In a possible design, the at least one power control parameter may include one or more of the following: the nominal power, the pathloss compensation factor, a pathloss reference signal identifier, and a closed-loop index.

In a possible design, the uplink signal may include an uplink sounding reference signal SRS and/or an uplink positioning reference signal, and the uplink channel includes a physical uplink shared channel PUSCH and/or a physical uplink control channel PUCCH.

In a possible design, the power control parameter in the power control parameter set may be associated with the uplink signal or the uplink channel.

In a possible design, the transceiver module is further configured to receive the parameter offset set from the network device.

In a possible design, the transceiver module is further configured to receive priority information from the network device. The priority information indicates a priority of the power control parameter set corresponding to the TCI state.

In a possible design, there are one or more parameter offset sets.

It should be noted that, the transceiver module in the seventh aspect may include a receiving module and a sending module. The receiving module is configured to receive data and/or signaling from the network device. The sending module is configured to send data and/or signaling to the network device. A specific implementation of the transceiver module is not specifically limited in this application.

Optionally, the power control parameter determining apparatus in the seventh aspect may further include a storage module, and the storage module stores a program or instructions. When the processing module executes the program or the instructions, the power control parameter determining apparatus in the seventh aspect is enabled to perform the method according to the third aspect.

It should be noted that, the power control parameter determining apparatus in the seventh aspect may be a terminal device, or may be a chip (system) or another part or component that can be disposed in the terminal device. This is not limited in this application.

In addition, for technical effects of the power control parameter determining apparatus in the seventh aspect, refer to the technical effects of the power control parameter determining method according to any possible implementation of the third aspect. Details are not described herein again.

According to an eighth aspect, a power control parameter determining apparatus is provided. The power control parameter determining apparatus includes a transceiver module and a processing module.

The transceiver module is configured to send a parameter offset set to a terminal device. The parameter offset set includes an uplink signal and/or an uplink channel and a corresponding offset of at least one power control parameter.

The processing module is configured to send downlink signaling to the terminal device. The downlink signaling indicates a TCI state, the TCI state corresponds to a power control parameter set, and the power control parameter set includes the at least one power control parameter.

In a possible design, the offset of the at least one power control parameter may include one or more of the following: an offset of nominal power, an offset of a pathloss, and an offset of a pathloss compensation factor.

In a possible design, the at least one power control parameter may include one or more of the following: the nominal power, the pathloss compensation factor, a pathloss reference signal identifier, and a closed-loop index.

In a possible design, the uplink signal may include an uplink sounding reference signal SRS and/or an uplink positioning reference signal, and the uplink channel may include a physical uplink shared channel PUSCH and/or a physical uplink control channel PUCCH.

In a possible design, the power control parameter in the power control parameter set may be associated with the uplink signal or the uplink channel.

In a possible design, the transceiver module is further configured to send the parameter offset set to the terminal device.

In a possible design, the transceiver module is further configured to receive priority information from the network device. The priority information indicates a priority of the power control parameter set corresponding to the TCI state.

In a possible design, there are one or more parameter offset sets.

It should be noted that, the transceiver module in the eighth aspect may include a receiving module and a sending module. The receiving module is configured to receive data and/or signaling from the terminal device. The sending module is configured to send data and/or signaling to the terminal device. A specific implementation of the transceiver module is not specifically limited in this application.

Optionally, the power control parameter determining apparatus in the eighth aspect may further include a storage module, and the storage module stores a program or instructions. When the processing module executes the program or the instructions, the power control parameter determining apparatus in the eighth aspect is enabled to perform the method according to the fourth aspect.

It should be noted that, the power control parameter determining apparatus in the eighth aspect may be a network device, or may be a chip (system) or another part or component that can be disposed in the network device. This is not limited in this application.

In addition, for technical effects of the power control parameter determining apparatus in the eighth aspect, refer to the technical effects of the power control parameter determining method according to any possible implementation of the third aspect. Details are not described herein again.

According to a ninth aspect, a power control parameter determining apparatus is provided. The power control parameter determining apparatus includes a processor, the processor is coupled to a memory, and the memory is configured to store a computer program.

The processor is configured to execute the computer program stored in the memory, so that the power control parameter determining apparatus performs the power control parameter determining method according to any one of the possible implementations of the first aspect to the fourth aspect.

In a possible design, the power control parameter determining apparatus in the ninth aspect may further include a transceiver. The transceiver may be a transceiver circuit or an input/output port. The transceiver may be used by the power control parameter determining apparatus to communicate with another device.

It should be noted that, the input port may be configured to implement a receiving function in the first aspect to the fourth aspect, and the output port may be configured to implement a sending function in the first aspect to the fourth aspect.

In this application, the power control parameter determining apparatus in the ninth aspect may be a terminal device, a network device, or a chip or a chip system disposed inside the terminal device or the network device.

In addition, for technical effects of the power control parameter determining apparatus in the ninth aspect, refer to the technical effects of the power control parameter determining method according to any one of the implementations of the first aspect to the fourth aspect. Details are not described herein again.

According to a tenth aspect, a communication system is provided. The communication system includes a network device and a terminal device. There may be one or more terminal devices, and there may be one or more network devices.

According to an eleventh aspect, a chip system is provided. The chip system includes a processor and an input/output port. The processor is configured to implement a processing function in the first aspect to the fourth aspect, and the input/output port is configured to implement sending and receiving functions in the first aspect to the fourth aspect. Specifically, the input port may be configured to implement the receiving function in the first aspect to the fourth aspect, and the output port may be configured to implement the sending function in the first aspect to the fourth aspect.

In a possible design, the chip system further includes a memory, and the memory is configured to store program instructions and data for implementing functions in the first aspect to the fourth aspect.

The chip system may include a chip, or may include a chip and another discrete component.

According to a twelfth aspect, a computer-readable storage medium is provided, including a computer program or instructions. When the computer program or the instructions are run on a computer, the computer is enabled to perform the power control parameter determining method according to any one of the possible implementations of the first aspect to the fourth aspect.

According to a thirteenth aspect, a computer program product is provided, including a computer program or instructions. When the computer program or the instructions are run on a computer, the computer is enabled to perform the power control parameter determining method according to any one of the possible implementations of the first aspect to the fourth aspect.

BRIEF DESCRIPTION OF DRAWINGS

FIG. 1 is a schematic diagram of an architecture of a communication system according to an embodiment of this application;

FIG. 2 is a schematic diagram of MAC CE signaling according to an embodiment of this application;

FIG. 5 is a schematic diagram of a mapping relationship according to an embodiment of this application;

FIG. 6 is a schematic diagram of another mapping relationship according to an embodiment of this application;

FIG. 7 is a schematic diagram of another mapping relationship according to an embodiment of this application;

FIG. 8 is a schematic diagram of a parameter subset according to an embodiment of this application;

FIG. 9 is a schematic diagram of another parameter subset according to an embodiment of this application;

FIG. 10 is a schematic diagram of another parameter subset according to an embodiment of this application;

FIG. 13 is a schematic diagram of another mapping relationship according to an embodiment of this application;

DESCRIPTION OF EMBODIMENTS

Figure 3:
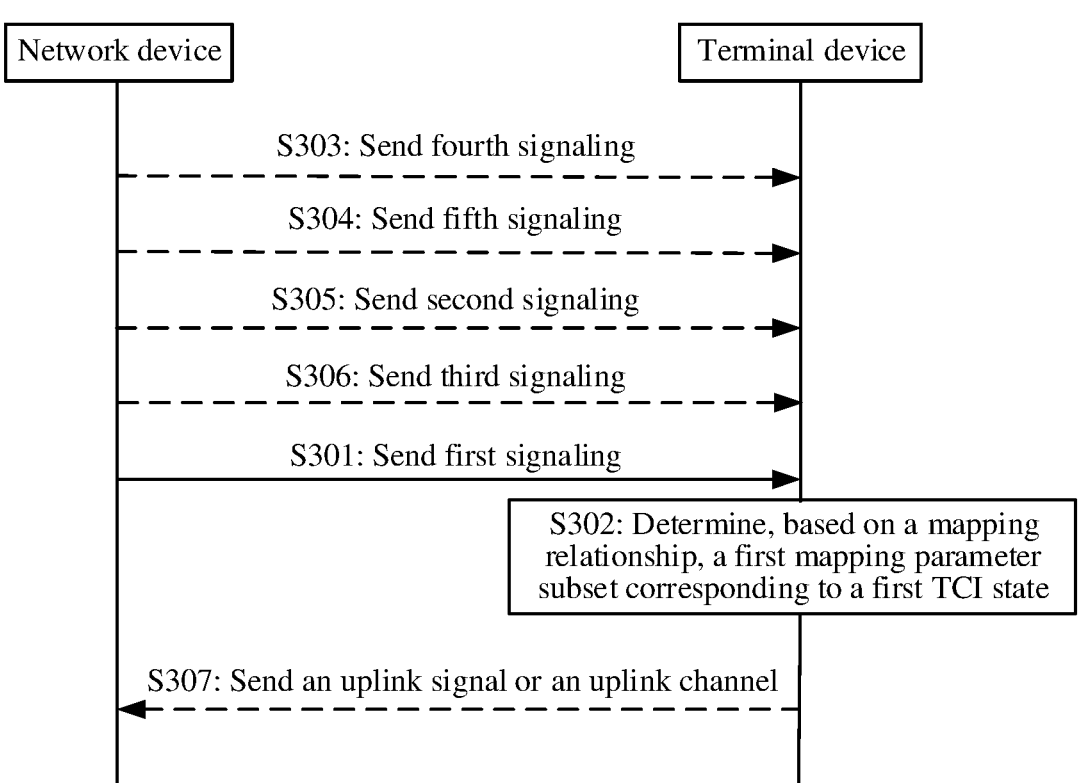
FIG. 3 is a schematic flowchart of a power control parameter determining method according to an embodiment of this application.

The following describes technical solutions of this application with reference to accompanying drawings.

The technical solutions in embodiments of this application may be applied to various communication systems, for example, a long term evolution (LTE) system, an LTE frequency division duplex (FDD) system, a universal mobile telecommunications system (UMTS), a 5th generation (5G) communication system, another wireless communication system using an orthogonal frequency division multiplexing (OFDM) technology, and a future communication system, such as a 6th generation (6G) mobile communication system. A specific type of the communication system is not limited in this application.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application, sometimes an uppercase letter such as A may be mistakenly written as a lowercase letter such as a, and sometimes a lowercase letter such as m may be mistakenly written as an uppercase letter such as M. When a difference between the letters is not emphasized, meanings to be expressed by the letters are consistent.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

For ease of understanding of embodiments of this application, a communication system shown in FIG. 1 is used as an example to first describe in detail a communication system applicable to embodiments of this application. For example, FIG. 1 is a schematic diagram of an architecture of a communication system to which a power control parameter determining method is applicable according to an embodiment of this application.

As shown in FIG. 1, the communication system includes a network device and a terminal device. There may be one or more terminal devices, and there may be one or more network devices.

The network device may also be referred to as a radio access network device or a next-generation radio access network device. The terminal device may communicate with the network device by using a beam.

The network device is a device that is located on a network side of the communication system and has wireless sending and receiving functions, or a chip or a chip system that may be disposed in the device. The network device includes but is not limited to: an access point (AP) such as a home gateway, a router, a server, a switch, or a bridge, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a radio relay node, a radio backhaul node, or a transmission and reception point (TRP, or TP) in a wireless fidelity (Wi-Fi) system; a gNB or a transmission point (TRP or TP) in a 5G system such as a new radio (NR) system; one antenna panel or a group of antenna panels (including a plurality of antenna panels) of a base station in a 5G system; or a network node, such as a baseband unit (BBU), a distributed unit (DU), or a road side unit (RSU) having a base station function, that forms a gNB or a transmission point. Alternatively, the network device may be a radio controller in a cloud radio access network (CRAN) scenario, a base station device in a future 5G network, a network device in a future evolved public land mobile network (PLMN), a wearable device, a vehicle-mounted device, or the like.

The terminal device is a terminal accessing the communication system and having wireless sending and receiving functions, or a chip or a chip system that can be disposed in the terminal. The terminal device may also be referred to as user equipment (UE), a user apparatus, an access terminal, a subscriber unit, a subscriber station, a mobile station, a remote station, a remote terminal, a mobile device, a user terminal, a terminal, a terminal unit, a terminal station, a terminal apparatus, a wireless communication device, a user agent, or a user apparatus. The terminal device in embodiments of this application may be a mobile phone, a tablet computer (Pad), a computer with wireless sending and receiving functions, a virtual reality (VR) terminal device, an augmented reality (AR) terminal device, a wireless terminal in industrial control, a wireless terminal in self-driving (self-driving), a wireless terminal in telemedicine, a wireless terminal in a smart grid (smart grid), a wireless terminal in transportation safety, a wireless terminal in a smart city, a wireless terminal in a smart home (for example, a game console, a smart television, a smart speaker, a smart refrigerator, and fitness equipment), a vehicle-mounted terminal, or an RSU having a terminal function. The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a wearable device, a terminal device in a future 5G network, a terminal device in a future evolved PLMN network, or the like. For example, the terminal device in embodiments of this application may alternatively be an express delivery terminal in smart logistics (for example, a device that can monitor a location of a goods vehicle or a device that can monitor a temperature and humidity of goods), a wireless terminal in smart agriculture (for example, a wearable device that can collect data related to livestock), a wireless terminal in a smart building (for example, a smart elevator, a fire monitoring device, or a smart meter), a wireless terminal in smart healthcare (for example, a wearable devices that can monitor a physiological state of a person or an animal), a wireless terminal in smart transportation (for example, a smart bus, a smart vehicle, a shared bicycle, a charging pile monitoring device, smart traffic lights, a smart monitor, and a smart parking device), or a wireless terminal in smart retail (for example, a vending machine, a self-checkout machine, or an unmanned convenience store). The terminal device in this application may alternatively be a vehicle-mounted module, a vehicle-mounted component, a vehicle-mounted chip, or a vehicle-mounted unit built in a vehicle as one or more components or units. The vehicle may implement a power control parameter determining method in this application by using the built-in vehicle-mounted module, vehicle-mounted component, vehicle-mounted chip, or vehicle-mounted unit.

It should be noted that, the power control parameter determining method provided in embodiments of this application is applicable between the terminal device and the network device shown in FIG. 1. For specific implementation, refer to the following method embodiments. Details are not described herein again.

It should be noted that the solutions in embodiments of this application may also be applied to another communication system, and a corresponding name may also be replaced with a name of a corresponding function in the another communication system.

It should be understood that FIG. 1 is merely a simplified schematic diagram of an example for ease of understanding. The communication system may further include another device, such as a network control device. The network control device may be an operation, administration, and maintenance (OAM) system, which is also referred to as a network management system. The network control device may manage the foregoing network device.

In addition, a person of ordinary skill in the art may learn that the technical solutions provided in embodiments of this application are also applicable to a similar technical problem as a network architecture evolves and a new service scenario emerges.

To make embodiments of this application clearer, the following uniformly describes some content and concepts related to embodiments of this application.

1. Beam

The beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams.

A plurality of beams having a same communication characteristic or similar communication characteristics may be considered as one beam. One beam may include one or more antenna ports, configured to transmit a data channel, a control channel, a sounding signal, and the like. For example, a transmit beam refers to signal strength distribution in different spatial directions after a radio signal is transmitted through an antenna, and a receive beam refers to signal strength distribution, in different spatial directions, of a radio signal received from an antenna. It may be understood that one or more antenna ports included in one beam may be considered as one antenna port set.

When a low frequency band or an intermediate frequency band is used, a signal may be sent in an omnidirectional manner or a signal may be sent at a relatively wide angle. When a high frequency band is used, because a wavelength of the high frequency band is relatively short, an antenna size is relatively small. Therefore, a plurality of antenna elements may be disposed at a transmit end and a receive end to form an antenna array. In this way, the transmit end sends a signal by using a specific beamforming weight, so that the sent signal forms a beam with spatial directivity, and the receive end receives the signal through the antenna array by using the specific beamforming weight, so that receive power of the signal at the receive end can be increased, to prevent a pathloss.

In a new radio (NR) protocol, a beam may be represented by a spatial domain filter, a spatial filter, a spatial domain parameter, a spatial parameter, a spatial domain setting, a spatial setting, QCL information, a QCL assumption, a QCL indicator, or the like. The beam may be indicated by using a transmission configuration indicator (TCI) state. The beam may alternatively be indicated by using a spatial relation parameter. Therefore, in embodiments of this application, the beam may be replaced with a spatial domain filter, a spatial filter, a spatial domain parameter, a spatial parameter, a spatial domain setting, a spatial setting, QCL information, a QCL assumption, a QCL indicator, a TCI state (including a DL TCI state and/or a UL TCI state), a spatial relation, or the like. The foregoing terms may also be equivalent to each other. Certainly, the beam may alternatively be replaced with another term for representing a beam. This is not limited in embodiments of this application.

2. Quasi-Co-Location (QCL)

QCL indicates that a plurality of resources have one or more same or similar communication characteristics, and a same communication configuration or similar communication configurations may be used for a plurality of resources that have a QCL relationship. For example, if two antenna ports have a QCL relationship, a channel large-scale characteristic of transmitting one symbol by one port may be inferred from a channel large-scale characteristic of transmitting one symbol by the other port. The channel large-scale characteristic may include: a delay spread, an average delay, a Doppler spread, a Doppler frequency shift, an average gain, a reception parameter, a terminal device received beam number, a transmit/receive channel correlation, a reception angle of arrival, a spatial correlation of a receiver antenna, a dominant angle of arrival (AoA), an average angle of arrival, an AoA spread, and the like.

In specific implementation, that QCL indicates whether at least two groups of antenna ports have a co-location relationship is: The QCL indicates whether channel state information reference signals sent by the at least two groups of antenna ports are from a same transmission point, or the QCL indicates whether channel state information reference signals sent by the at least two groups of antenna ports are from a same beam group.

3. Reference Signal (RS)

According to an LTE/NR protocol, at a physical layer, uplink communication includes transmission of an uplink channel and an uplink signal. The uplink channel (or referred to as an uplink physical channel) may include but is not limited to one or more of the following: a physical random access channel (PRACH), a PUCCH, a PUSCH, and the like. The uplink signal may include but is not limited to one or more of the following: an uplink sounding reference signal (SRS), a physical uplink control channel demodulation reference signal (PUCCH-DMRS), a physical uplink shared channel demodulation reference signal (PUSCH- DMRS), a phase tracking reference signal (PTRS), an uplink positioning reference signal (uplink positioning RS), and the like.

Downlink communication includes transmission of a downlink channel and a downlink signal. The downlink channel (or referred to as a downlink physical channel) includes: a physical broadcast channel (PBCH), a physical downlink control channel (PDCCH), a physical downlink shared channel (PDSCH), or the like. The downlink signal includes: a primary synchronization signal (PSS)/secondary synchronization signal (SSS), a physical downlink control channel demodulation reference signal (PDCCH-DMRS), a physical downlink shared channel demodulation reference signal (PDSCH-DMRS), a PTRS, a channel state information reference signal (CSI-RS), a cell reference signal (CRS) (this signal does not exist in NR), a tracking reference signal (TRS) (this signal does not exist in LTE), an LTE/NR positioning reference signal (positioning reference signal), or the like.

4. Transmission Configuration Indicator (TCI)

The TCI is a field that is in downlink control information (DCI) and that indicates quasi-co-location of PDSCH antenna ports.

The TCI is configured through RRC signaling, and is referred to as a transmission configuration indicator state (TCI-state) in configuration signaling. QCL may be configured by using the TCI-state. A parameter of the TCI state indicates to configure a QCL relationship between one or two downlink reference signals (which may be used as source reference signals) and a received target reference signal. The TCI-state includes one or two QCL relationships. The QCL indicates a consistency relationship between a currently to-be-received signal and a previously known reference signal. If a QCL relationship exists, a terminal device may receive or send an upcoming signal or channel by using a receiving or sending parameter used for previously receiving or sending a reference signal.

QCL types include a QCL type A, a QCL type B, a QCL type C, and a QCL type D. The QCL type D may indicate a beam, and the QCL type A/B/C indicates information such as a time domain offset and a frequency domain offset, and may be used to assist a terminal device in data receiving and demodulation.

After the TCI is configured through RRC, a network device sends a MAC CE to activate one or more TCI-states. Further, the network device may send DCI to indicate to perform communication by using one of the one or more activated TCI-states.

It should be understood that the foregoing listed representations of the beam, the quasi-co-location, the reference signal, and the transmission configuration indicator are merely examples, and do not constitute any limitation on this application. This application does not exclude a possibility that other terms are defined in a future protocol to indicate same or similar meanings.

5. Power Control Parameter

The power control parameter may include but is not limited to one or more of the following: nominal power P0, a pathloss compensation factor α, a pathloss reference signal identifier PL-RS ID, and a closed-loop index.

The nominal power P0 is power that a network device expects an uplink signal or an uplink channel to reach when the uplink signal or the uplink channel arrives at the network device. A value of the nominal power may be configured by the network device for a terminal device.

The pathloss reference signal (PL-RS) is used to determine a pathloss of an uplink signal or an uplink channel. Specifically, a terminal device may determine, by using power at which a network device sends a pathloss reference signal and power at which the terminal device receives the PL-RS, a pathloss of an uplink signal or an uplink channel transmitted between the terminal device and the network device. For example, pathloss PL=PL-RS transmit power–PL-RS receive power.

The pathloss reference signal may include but is not limited to one or more of the following: a CSI-RS or a synchronization signal block (SSB).

The closed-loop index may also be referred to as an identifier of a closed-loop power control parameter, and the closed-loop index is used to determine an index of an applied closed-loop power control parameter set.

A terminal device may perform uplink power control by using a power control parameter from a network device. For example, the terminal device receives the power control parameter, determines a pathloss PL by using a pathloss reference signal, and then determines transmit power of an uplink signal or an uplink channel based on the pathloss PL and the nominal power P0. For example, transmit power=P0+PL. For uplink power control, the network device needs to configure a plurality of power control parameters for the terminal device. Different uplink beams are sent by using different modulation methods and different code rates, and are corresponding to different uplink coverage targets. Therefore, power control is performed for different uplink signals or uplink channels by correspondingly using different power control parameters. A PL-RS in the power control parameters is used as an example. In consideration of a change in a transmission environment caused by mobility of a terminal device, especially in high frequency communication (for example, millimeter wave communication), a change in a transmit beam of the terminal device and a change in a receive beam of a network device need to be further considered. There are usually more than one PL-RSs.

In NR, power control parameters of different uplink signals or different uplink channels are indicated by using different methods. A PL-RS is used as an example. It is assumed that an uplink signal includes an SRS, and uplink channels include a PUSCH and a PUCCH. PL-RSs corresponding to the SRS, the PUSCH, and the PUCCH are separately indicated, and the PL-RSs corresponding to the SRS, the PUSCH, and the PUCCH are indicated by using different indication methods or signaling. For example, for the SRS and the PUSCH, PL-RSs are indicated by using different signaling (for example, different MAC CE signaling). For another example, for the PUCCH, a PL-RS corresponding to the PUCCH is included in a beam indicator, and the beam indicator is different from MAC CE signaling. For example, in the 3GPP standard NR Release 16 (R16 or Rel-16) protocol release, an uplink beam indicator is referred to as a spatial relation (spatial relationship). In the evolved Rel-17 protocol release, an uplink beam indicator is referred to as an uplink (UL) TCI.

For example, in Rel-16, for the SRS and the PUSCH, network device uses MAC CE signaling shown in (a) in FIG. 2 to indicate a PL-RS used to determine a pathloss of the SRS, and the network device uses MAC CE signaling shown in (b) in FIG. 2 to indicate a PL-RS used to determine a pathloss of the PUSCH. The MAC CE signaling shown in (a) in FIG. 2 includes: a serving cell identifier (serving cell ID), a bandwidth part identifier (BWP ID), an SRS resource set identifier (SRS Resource Set ID), a pathloss reference reference signal identifier (Pathloss Reference RS ID), and a reserved (R) field. The MAC CE signaling shown in (b) in FIG. 2 includes: a serving cell ID, a BWP ID, an uplink sounding reference signal resource index (SRI) identifier (ID), a PUSCH pathloss reference reference signal identifier (PUSCH Pathloss Reference RS ID), and a reserved field.

In the conventional technology, a process of exchanging a beam indicator and a power control parameter indicator between a network device and a terminal device is complex. Currently, there is no technical solution that can support simple completion of beam indication and power control parameter indication.

In addition, in the conventional technology, for different uplink signals or different uplink channels, different methods are used to indicate power control parameters. As a result, signaling overheads are high, and an uplink power control process is complex. Currently, there is no technical solution that can support simple indication of power control parameters of different uplink signals or different uplink channels.

In embodiments of this application, a beam indicator and a power control parameter indicator may be decoupled, and flexible association between the beam indicator and the power control parameter indicator may be implemented. As an uplink beam indicator is updated, a power control parameter is also determined. Therefore, simple completion of beam indication and power control parameter indication can be supported, so that signaling overheads can be reduced. In addition, the method provided in embodiments of this application can support joint indication of different uplink signals and/or different uplink channels. A process is simple, and signaling overheads can be further reduced.

The following describes in detail the power control parameter determining method in embodiments of this application with reference to FIG. 3 to FIG. 14.

For example, FIG. 3 is a schematic flowchart of a power control parameter determining method according to an embodiment of this application. The power control parameter determining method is applicable to communication between the network device and the terminal device shown in FIG. 1.

As shown in FIG. 3, the power control parameter determining method includes the following steps.

S301: A network device sends first signaling to a terminal device. Correspondingly, the terminal device receives the first signaling from the network device.

The first signaling includes a first value of a downlink control information DCI field, and the first value is one of at least one value of the DCI field.

Optionally, the first signaling may be DCI signaling or DCI, and the first value is one of at least one value of the DCI signaling, or the first value is one of at least one value of the DCI.

Figure 4:
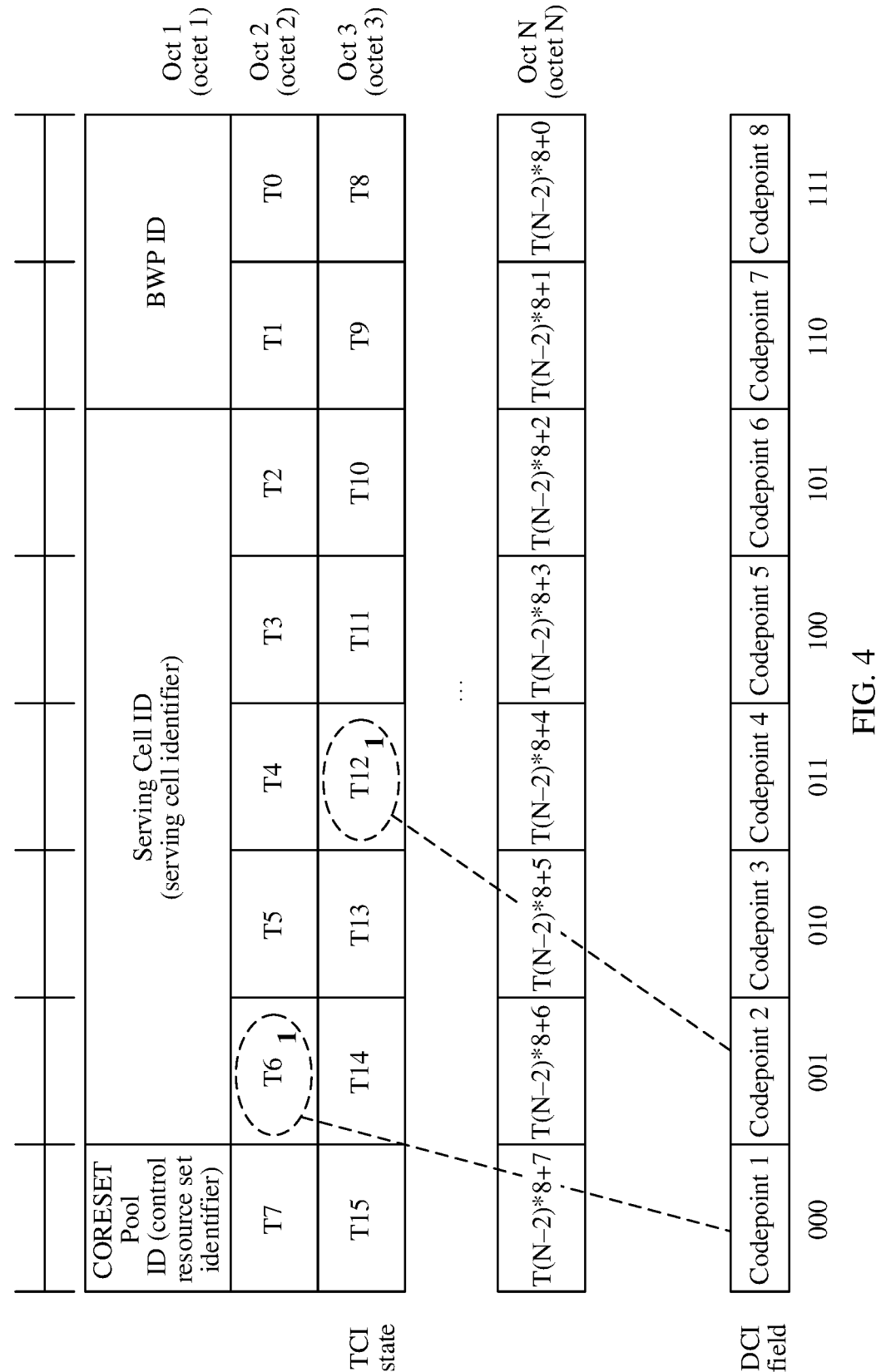
FIG. 4 is a schematic diagram of a TCI state and a value of a DCI field according to an embodiment of this application.

With reference to FIG. 4, if the DCI field includes three binary bits, the DCI field may correspond to $2^3=8$ values, and the eight values of the DCI field include: 000, 001, 010, 011, 100, 101, 110, and 111. Optionally, a combination of binary bits of the DCI field may be referred to as a codepoint (codepoint). In FIG. 3, a codepoint 1 to a codepoint 8 sequentially correspond to 000, 001, 010, 011, 100, 101, 110, and 111. The first value may be any one of 000, 001, 010, 011, 100, 101, 110, and 111. For example, the first value may be 000.

It should be noted that, a quantity of bits occupied by the DCI field is not limited in this application. A bit occupied by the DCI field in this embodiment of this application may be a bit for indicating a TCI state. Whether the DCI field includes a bit having another function is not limited.

Optionally, a DCI field that includes a bit for indicating a TCI state may be referred to as a transmission configuration indicator field.

For example, the first value indicates a first TCI state in at least one activated TCI state. In other words, the first value indicates the first TCI state, and the first TCI state is an activated TCI state in the at least one activated TCI state. In this way, after receiving the first signaling, the terminal device may obtain the first TCI state.

In some embodiments, the first value of the DCI indicates a first TCI state in at least one activated TCI state. Alternatively, the first value of the DCI signaling indicates a first TCI state in at least one activated TCI state.

Optionally, the activated TCI state may be a TCI state activated by using signaling from the network device.

In some embodiments, the power control parameter determining method provided in this embodiment of this application may further include the following step. S303: The network device sends fourth signaling to the terminal device. Correspondingly, the terminal device receives the fourth signaling from the network device.

Optionally, the fourth signaling may indicate to activate one or more TCI states in a TCI state set.

For example, the fourth signaling may be MAC CE signaling.

For example, the fourth signaling may indicate to set one or more TCI states to "1" or "0". For example, setting to "1" indicates activating, and setting to "0" indicates not activating (also referred to as deactivating). Alternatively, setting to "1" indicates not activating (also referred to as deactivating or non-activating), and setting to "0" indicates activating. In this embodiment of this application, an example in which setting to "1" indicates activating and setting to "0" indicates not activating is used for description.

With reference to FIG. 4, the TCI state set includes TCI states T0 to T(N−2)*8+7, and N is an integer greater than 1. The fourth signaling may indicate to set T6 to "1", and set T12 to "1". This indicates that T6 and T12 are to be activated. Optionally, the other TCI states are set to "0". Alternatively, it is considered by default that an initial status of each TCI state is non-activated (set to "0"). Therefore, no operation may be performed on the other TCI states, to reduce signaling overheads.

Optionally, the network device may update the fourth signaling. For example, the network device sends fourth signaling to the terminal device, and the fourth signaling is different from or the same as fourth signaling sent to the terminal device last time.

It should be noted that, neither a quantity of TCI states that can be activated by the fourth signaling nor a quantity of actually activated TCI states is limited in this embodiment of this application. For example, it is assumed that one piece of fourth signaling can activate eight TCI states. With reference to FIG. 4, the fourth signaling actually activates two TCI states.

Optionally, the TCI state set may be configured by the network device for the terminal device.

In some embodiments, the power control parameter determining method provided in this embodiment of this application may further include the following step. S304: The network device sends fifth signaling to the terminal device. Correspondingly, the terminal device receives the fifth signaling from the network device.

Optionally, the fifth signaling may include the TCI state set, and the TCI state set includes at least one TCI state. For example, the fifth signaling may be RRC signaling.

In this way, the network device may configure one or more TCI states for the terminal device by using the RRC signaling.

For example, with reference to FIG. 4, the fifth signaling may include TCI states T0 to T(N−2)*8+7, and N is an integer greater than 1. Optionally, the fifth signaling may further include but is not limited to one or more of the following: a control resource set identifier (control resource set pool identity, CORESET Pool ID), a serving cell ID, and a BWP ID. T0 to T(N−2)*8 represent TCI states configured by the network device for the terminal device.

In some embodiments, the at least one activated TCI state may be sequentially in a one-to-one correspondence with the at least one value of the DCI field.

For example, if a TCI state is set to "1", it indicates that the TCI state is activated and mapped to a codepoint of the DCI field. If a TCI state is set to "0", it indicates that the TCI state is not activated and is not mapped to a codepoint of the DCI field.

Optionally, a specific value (or codepoint) that is of the DCI field and that corresponds to an activated TCI state is determined by an ordinal position of the TCI state in all activated TCI states. Alternatively, a specific value (or codepoint) that is of the DCI field and that corresponds to an activated TCI state is determined by an activation ranking of the TCI state in all activated TCI states.

For example, a $k^{th}$ activated TCI state in the at least one activated TCI state corresponds to a $k^{th}$ value in the at least one value of the DCI field. Herein, k is an ordinal position of the activated TCI state in all the at least one activated TCI state, or k is an activation ranking of the activated TCI state in all the at least one activated TCI state.

Optionally, a $(k+1)^{th}$ value of the DCI field is greater than the $k^{th}$ value of the DCI field, and k is an integer greater than 0. In other words, values of the DCI field may be sorted in ascending order. As shown in FIG. 4, the $1^{st}$ value (codepoint 1) is 000, the $2^{nd}$ value (codepoint 2) is 001, and the $2^{nd}$ value 001 is greater than the $1^{st}$ value 000. Details are not described herein again.

For example, k is the ordinal position of the activated TCI state in all the at least one activated TCI state.

With reference to FIG. 4, it is assumed that T6 and T12 are activated TCI states, and T0 to T5, T7 to T11, and T13 to T(N−2)*8+7 are non-activated TCI states. If an ordinal position of T6 in all the at least one activated TCI state (T6 and T12) ranks $1^{st}$, T6 is the $1^{st}$ activated TCI state, and T6 is mapped to the $1^{st}$ value 000. Similarly, T12 is the $2^{nd}$ activated TCI state, and T12 is mapped to the $2^{nd}$ value 001.

In this case, it is assumed that the first value is 000. With reference to FIG. 4, it can be learned that 000 corresponds to T6. Therefore, it can be learned that the first TCI state is T6.

For example, k is the activation ranking of the activated TCI state in all the at least one activated TCI state.

With reference to FIG. 4, it is assumed that T6 and T12 are activated TCI states, and T0 to T5, T7 to T11, and T13 to T(N−2)*8+7 are non-activated TCI states. If T6 is first activated, and then T12 is activated, an activation ranking of the activated T6 in all the at least one activated TCI state (T6 and T12) is the $1^{st}$, T6 is the $1^{st}$ activated TCI state, and T6 is mapped to the $1^{st}$ value 000. Similarly, T12 is the $2^{nd}$ activated TCI state, and T12 is mapped to the $2^{nd}$ value 001.

In this case, it is assumed that the first value is 000. With reference to FIG. 4, it can be learned that 000 corresponds to T6. Therefore, it can be learned that the first TCI state is T6.

Optionally, when the ordinal position or the activation ranking of the activated TCI state in all the activated TCI states changes, a value corresponding to the activated TCI state may change.

For example, k is the ordinal position of the activated TCI state in all the at least one activated TCI state. It is assumed that T3, T6, and T12 are activated TCI states, and the other TCI states are not activated. An ordinal position of T3 in T3, T6, and T12 ranks $1^{st}$, an ordinal position of T6 in T3, T6, and T12 ranks $2^{nd}$, and an ordinal position of T12 in T3, T6, and T12 ranks $3^{rd}$. In this case, the $1^{st}$ activated TCI state T3 is mapped to the $1^{st}$ value 000, the $2^{nd}$ activated TCI state T6 is mapped to the $2^{nd}$ value 001, and the $3^{rd}$ activated TCI state T12 is mapped to the $3^{rd}$ value 010.

In this case, it is assumed that the first value is 000. 000 corresponds to T3. Therefore, it can be learned that the first TCI state is T3.

S302: The terminal device determines, based on a mapping relationship, a first mapping parameter subset corresponding to the first TCI state.

Optionally, the mapping relationship may be preconfigured, or may be configured by the network device for the terminal device.

In some scenarios, S301 may be optional.

The power control parameter determining method provided in this embodiment of this application may not include S301. For example, when there is one activated TCI state (for example, T6 in FIG. 4), the power control parameter determining method provided in this embodiment of this application may not include S301, and the terminal device uses the activated TCI state by default.

For example, in S302, the terminal device determines, based on the mapping relationship, a mapping parameter subset corresponding to T6.

The power control parameter determining method provided in this embodiment of this application may include S301. For example, when there are a plurality of activated TCI states, the power control parameter determining method provided in this embodiment of this application may include S301, and the terminal device determines a used activated TCI state according to the first signaling.

With reference to FIG. 4, if activated TCI states include T6 and T12, the first signaling includes a value 001, and the value 001 indicates the TCI state T12, in S302, the terminal device determines, based on the mapping relationship, a mapping parameter subset corresponding to T12.

The first mapping parameter subset is one of at least one mapping parameter subset.

For example, the mapping relationship may include a mapping relationship between an identifier of the at least one mapping parameter subset and the at least one value of the DCI field.

For example, the terminal device may determine, based on the mapping relationship, an identifier of a mapping parameter subset to which the first value of the DCI field is mapped. Because the first value of the DCI field indicates the first TCI state, the first mapping parameter subset corresponding to the first TCI state is the mapping parameter subset to which the first value of the DCI field is mapped.

Alternatively, the mapping relationship may include a mapping relationship between an identifier of the at least one mapping parameter subset and the at least one activated TCI state.

For example, the terminal device may determine, based on the mapping relationship between the identifier of the at least one mapping parameter subset and the at least one activated TCI state, an identifier of a mapping parameter subset to which the first TCI state is mapped, to obtain the first mapping parameter subset.

Optionally, the at least one mapping parameter subset is an activated parameter subset in at least one parameter set.

In some embodiments, each of the at least one parameter set includes at least one parameter subset.

Optionally, parameter subsets may not be grouped. For example, the at least one parameter set includes one parameter set. With reference to FIG. 5, the at least one parameter set includes one parameter set.

Alternatively, optionally, parameter subsets may be grouped. For example, the at least one parameter set includes a plurality of parameter sets.

With reference to FIG. 6 or FIG. 7, the at least one parameter set includes two parameter sets.

Optionally, the power control parameter determining method provided in this embodiment of this application may further include the following step. S305: The network device sends second signaling to the terminal device. Correspondingly, the terminal device receives the second signaling from the network device.

For example, the second signaling may include the at least one parameter set.

For example, the second signaling may be RRC signaling. In other words, the parameter set may be preconfigured by the network device by using the RRC signaling.

It should be noted that, a sequence of S305 and S304 is not limited in this embodiment of this application. For example, S305 and S304 may be performed in a same step, and a parameter subset and a TCI state are configured for the terminal device at the same time, so that signaling overheads can be reduced.

Optionally, the power control parameter determining method provided in this embodiment of this application may further include: The network device determines the at least one parameter set.

In some scenarios, a quantity of parameter subsets included in each parameter set may be configured.

For example, the quantity of parameter subsets included in each parameter set may be configured through predefinition in a protocol.

For example, the quantity of parameter subsets included in each parameter set is an integer multiple of 8. With reference to FIG. 5, the parameter set includes 24 parameter subsets. It is assumed that a MAC CE includes a bit sequence of eight length units. In this case, the quantity of parameter subsets included in each parameter set may correspond to a fixed format of MAC CE signaling.

Optionally, when there are a plurality of parameter sets, quantities of parameter subsets separately included in the plurality of parameter sets may be the same.

With reference to FIG. 6, the at least one parameter set includes two parameter sets, a parameter set 1 includes 16 parameter subsets, and a parameter set 2 includes 16 parameter subsets.

Alternatively, optionally, when there are a plurality of parameter sets, quantities of parameter subsets separately included in the plurality of parameter sets may be different.

With reference to FIG. 7, the at least one parameter set includes two parameter sets, a parameter set 1 includes 16 parameter subsets, and a parameter set 2 includes 8 parameter subsets.

Optionally, when there are a plurality of parameter sets, content included in parameter subsets that correspond to each other based on ordinal positions in the plurality of parameter sets may be the same.

With reference to FIG. 7, a parameter subset 1a ranks $1^{st}$ in a parameter set 1 based on an ordinal position, a parameter subset 1b ranks $1^{st}$ in a parameter set 2 based on an ordinal position, and content included in the parameter subset 1a and the parameter subset 1b may be the same. Similarly, content included in a parameter subset 2a to a parameter subset 8a of the parameter set 1 may be respectively the same as content included in a parameter subset 2b to a parameter subset 8b of the parameter set 2.

Similarly, with reference to FIG. 6, content included in a parameter subset 1a to a parameter subset 16a of the parameter set 1 may be respectively the same as content included in a parameter subset 1b to a parameter subset 16b of the parameter set 2.

Optionally, when there are a plurality of parameter sets, content included in parameter subsets that correspond to each other based on ordinal positions in the plurality of parameter sets may be different.

With reference to FIG. 7, a parameter subset 1a ranks $1^{st}$ in a parameter set 1 based on an ordinal position, a parameter subset 1b ranks $1^{st}$ in a parameter set 2 based on an ordinal position, and content included in the parameter subset 1a and the parameter subset 1b may be different. Similarly, content included in a parameter subset 2a to a parameter subset 8a of the parameter set 1 may be respectively different from content included in a parameter subset 2b to a parameter subset 8b of the parameter set 2.

Similarly, with reference to FIG. 6, content included in a parameter subset 1a to a parameter subset 16a of the parameter set 1 may be respectively different from content included in a parameter subset 1b to a parameter subset 16b of the parameter set 2.

In other words, whether the content included in the parameter subsets that correspond to each other based on the ordinal positions in the plurality of parameter sets is the same is unrelated to whether the quantities of parameter subsets included in the plurality of parameter sets are the same.

Alternatively, with reference to FIG. 7, the parameter subset 1a to the parameter subset 7a of the parameter set 1 may be respectively different from the parameter subset 1b to the parameter subset 7b of the parameter set 2, and the parameter subset 8a may be the same as the parameter subset 8b. In other words, content included in some parameter subsets that correspond to each other in the plurality of parameter sets is the same, and content included in other parameter subsets that correspond to each other is different.

Optionally, when there are a plurality of parameter sets, the plurality of parameter sets may be completely the same. For example, "completely the same" may mean that quantities of parameter subsets included in the plurality of parameter sets are the same, and content included in parameter subsets that correspond to each other based on ordinal positions is the same.

With reference to FIG. 6, the parameter set 1 may be the same as the parameter set 2. Specifically, the parameter set 1 includes 16 parameter subsets, and the parameter set 2 includes 16 parameter subsets. Content included in a parameter subset 1a to a parameter subset 16a of the parameter set 1 may be respectively the same as content included in a parameter subset 1b to a parameter subset 16b of the parameter set 2.

In some embodiments, each of the at least one parameter subset includes at least one uplink signal and/or at least one uplink channel and a corresponding power control parameter set.

With reference to FIG. 5, each parameter subset (parameter subset 1 to parameter subset 24) may include a power control parameter set and an uplink signal and/or an uplink channel to which the power control parameter set is applied.

In this way, joint indication of different uplink signals and/or different uplink channels is supported, a process is simple, and power control parameters do not need to be indicated for different uplink signals and different uplink channels by using different methods, so that signaling overheads can be reduced.

Optionally, each parameter subset may be corresponding to or associated with an identifier of the parameter subset, or each parameter subset may further include an identifier of the parameter subset. For example, with reference to FIG. 5, an identifier of a parameter subset ranking $1^{st}$ may be parameter subset 1.

For example, the at least one uplink signal may include but is not limited to one or more of the following: an SRS and/or an uplink positioning reference signal. The at least one uplink channel may include but is not limited to one or more of the following: a PUSCH and/or a PUCCH.

In some embodiments, the power control parameter set may include at least one power control parameter.

In other words, the power control parameter set may include one or more power control parameters. The at least one power control parameter may be implemented in a form of a set.

In some embodiments, each of the at least one parameter subset includes at least one uplink signal and/or at least one uplink channel and at least one corresponding power control parameter. In other words, the at least one power control parameter may not be implemented in a form of a set. For an implementation, refer to the implementation in which the power control parameter set is used as an example in this embodiment of this application.

For example, the at least one power control parameter may include but is not limited to one or more of the following: nominal power P0, a pathloss compensation factor (alpha, $\alpha$), a pathloss reference signal identifier PL-RS ID, and a closed-loop index (closed-loop index).

The PL-RS ID includes but is not limited to one or more of the following: a channel state information reference signal CSI-RS ID or an SSB index.

For example, the channel state information reference signal identifier CSI-RS ID may be a channel state information reference signal resource identifier (CSI-RS resource ID) or a channel state information reference signal resource set identifier (CSI-RS resource set ID).

The following describes a correspondence between the uplink signal and/or the at least one uplink channel and the power control parameter set.

Manner 1: There is one power control parameter set, and the at least one uplink signal and/or the at least one uplink channel are/is corresponding to the same power control parameter set.

For example, the uplink signal includes an SRS and an uplink positioning reference signal, and the uplink channel includes a PUSCH and a PUCCH. With reference to Table 1, the SRS, the uplink positioning reference signal, the PUSCH, and the PUCCH all correspond to a power control parameter set 1.

TABLE 1

| Used uplink signal and/or uplink channel | Power control parameter set |
|---|---|
| SRS, uplink positioning reference signal, PUSCH, and PUCCH | Power control parameter set 1 |

In other words, one power control parameter set may be configured for the SRS, the uplink positioning reference signal, the PUSCH, and the PUCCH, and configuration is simple.

With reference to FIG. 8, a parameter subset may include an SRS, an uplink positioning reference signal, a PUSCH, a PUCCH, and a jointly corresponding power control parameter set. Optionally, the parameter subset may further include an identifier of the parameter subset.

Manner 2: There is at least one power control parameter set, and the at least one uplink signal and/or the at least one uplink channel are/is in a one-to-one correspondence with the at least one power control parameter set.

For example, a power control parameter set may be separately configured for each uplink signal and each uplink channel. Configuration is flexible and simple, and different requirements in different transmission scenarios can be met.

For example, at least two uplink signals, at least two uplink channels, or at least one uplink signal and at least one uplink channel correspond to different power control parameter sets.

With reference to a manner a in Table 2, an SRS corresponds to a power control parameter set 2, an uplink positioning reference signal corresponds to a power control parameter set 3, a PUSCH corresponds to a power control parameter set 4, and a PUCCH corresponds to a power control parameter set 5.

For another example, at least two uplink signals, at least two uplink channels, or at least one uplink signal and at least one uplink channel correspond to a same power control parameter set.

With reference to a manner b in Table 2, an SRS corresponds to a power control parameter set 6, an uplink positioning reference signal corresponds to the power control parameter set 6, a PUSCH corresponds to the power control parameter set 6, and a PUCCH corresponds to the power control parameter set 6.

TABLE 2

| Used uplink signal and/or uplink channel | Power control parameter set (manner a) | Power control parameter set (manner b) |
|---|---|---|
| SRS | Power control parameter set 2 | Power control parameter set 6 |
| Uplink positioning reference signal | Power control parameter set 3 | Power control parameter set 6 |
| PUSCH | Power control parameter set 4 | Power control parameter set 6 |
| PUCCH | Power control parameter set 5 | Power control parameter set 6 |

It should be noted that, whether power control parameter sets corresponding to the uplink signal and/or the uplink channel are the same is not limited in this embodiment of this application. For example, the SRS corresponds to the power control parameter set 2, the uplink positioning reference signal corresponds to the power control parameter set 3, the PUSCH corresponds to the power control parameter set 2, and the PUCCH corresponds to the power control parameter set 5. Details are not listed one by one.

For example, each uplink signal, each uplink channel, and each corresponding power control parameter set may be configured in one parameter subset, and an identifier of the parameter subset is used for identification.

With reference to FIG. 9, a parameter subset may include an SRS, an uplink positioning reference signal, a PUSCH, a PUCCH, and separately corresponding power control parameter sets. Optionally, the parameter subset may further include an identifier of the parameter subset.

Manner 3: There is at least one power control parameter set, all uplink signals correspond to one power control parameter set, and all uplink channels correspond to one power control parameter set.

With reference to Table 3, an SRS and an uplink positioning reference signal correspond to a power control parameter set 7, and a PUSCH and a PUCCH correspond to a power control parameter set 8.

TABLE 3

| Used uplink signal and/or uplink channel | Power control parameter set |
|---|---|
| SRS and uplink positioning reference signal | Power control parameter set 7 |
| PUSCH and PUCCH | Power control parameter set 8 |

In other words, one power control parameter set may be configured for all uplink signals, and one power control parameter set may be configured for all uplink channels.

With reference to FIG. 9, a parameter subset may include an SRS, an uplink positioning reference signal, and a jointly corresponding power control parameter set; and a PUSCH, a PUCCH, and a jointly corresponding power control parameter set. Optionally, the parameter subset may further include an identifier of the parameter subset.

It should be noted that, the correspondence between the uplink signal and/or the at least one uplink channel and the power control parameter set is not limited in this embodiment of this application. For example, with reference to FIG. 10, an SRS and a PUSCH jointly correspond to one power control parameter set, and an uplink positioning reference signal and a PUCCH jointly correspond to one power control parameter set.

In some embodiments, a correspondence between a reference signal and/or an uplink channel and a power control parameter set may be implemented in different manners in a plurality of parameter subsets.

With reference to FIG. 5, for example, the foregoing manner 1 is used for a parameter subset 1 to a parameter subset 8, the foregoing manner 2 is used for a parameter subset 9 to a parameter subset 16, and the foregoing manner 3 is used for a parameter subset 17 to a parameter subset 24.

In a possible design, the power control parameter determining method provided in this embodiment of this application may further include: The network device sends the power control parameter set to the terminal device. Correspondingly, the terminal device receives the power control parameter set from the network device.

For example, the power control parameter set may be preconfigured by the network device for the terminal device by using higher layer signaling (for example, RRC signaling).

In some embodiments, a mapping parameter subset may be an activated parameter subset.

For example, setting to "1" indicates activating, and setting to "0" indicates not activating (also referred to as deactivating). The mapping parameter subset may be a parameter subset that is set to "1". For example, setting to "1" indicates not activating, and setting to "0" indicates activating. The mapping parameter subset may be a parameter subset that is set to "0". In this embodiment of this application, an example in which setting to "1" indicates activating and setting to "0" indicates not activating is used for description.

It should be noted that, the mapping parameter subset may be referred to as an activated parameter subset, an active parameter subset, or another name that can express a corresponding meaning, for example, a started parameter subset or a start-up parameter subset. Setting to "1" indicates starting, and setting to "0" indicates not starting. Alternatively, setting to "1" indicates not starting, and setting to "0" indicates starting.

In some embodiments, it may be considered by default that each of the at least one parameter subset received by the terminal device by using the second signaling is an activated parameter subset. For example, the second signaling includes at least one parameter set, and each of the at least one parameter set includes at least one mapping parameter subset.

In a possible design, the power control parameter determining method provided in this embodiment of this application may further include the following step. S306: The network device sends third signaling to the terminal device. Correspondingly, the terminal device receives the third signaling from the network device.

For example, the third signaling may be used to activate one or more parameter subsets in the at least one parameter subset. For example, the third signaling may be MAC CE signaling.

For example, the third signaling may indicate to set one or more parameter subsets to "1" or "0".

For example, setting to "1" indicates activating, and setting to "0" indicates not activating. With reference to FIG. 5, if a parameter subset 1 and a parameter subset 11 are expected to be activated, the parameter subset 1 may be set to "1" and the parameter subset 11 may be set to "1". Optionally, the other parameter subsets are set to "0". Alternatively, it is considered by default that an initial status of each parameter subset is non-activated (set to "0"). Therefore, no operation may be performed on the other parameter subsets, to reduce signaling overheads.

Optionally, the network device may update the third signaling. For example, the network device sends third signaling to the terminal device, and the third signaling is different from or the same as third signaling sent to the terminal device last time.

It should be noted that, neither a quantity of parameter subsets that can be activated by one piece of third signaling nor a quantity of actually activated parameter subsets is limited in this embodiment of this application. For example, it is assumed that one piece of third signaling can activate eight parameter subsets. With reference to FIG. 5, the third signaling actually activates two parameter subsets.

It should be noted that, a sequence of S306 and S303 is not limited in this embodiment of this application. For example, S306 and S303 may be performed in a same step, and a parameter subset and a TCI state are activated at the same time.

In some scenarios, one parameter set may include one or more mapping parameter subsets.

For example, with reference to FIG. 5, a parameter subset 1 may be set to "1", and a parameter subset 11 may be set to "1". That is, one or more parameter subsets in one parameter set may be set to activated. This is merely an example, and more or fewer parameter subsets may be activated. This is not limited in this embodiment of this application.

In some scenarios, one parameter set includes a maximum of one mapping parameter subset.

For example, the at least one mapping parameter subset is in a one-to-one correspondence with the at least one parameter set, and each of the at least one parameter set includes one mapping parameter subset.

With reference to FIG. 6, a parameter subset Ta in a parameter set 1 may be set to "1", and a parameter subset 3b in a parameter set 2 may be set to "1". The parameter set 1 and the parameter set 2 each include one mapping parameter subset.

For another example, a parameter set may not include a mapping parameter subset.

With reference to FIG. 7, all parameter subsets in a parameter set 1 are set to "0", and a parameter subset 3b in a parameter set 2 is set to "1". In other words, some parameter sets each include one mapping parameter subset, and the other parameter sets include no mapping parameter subset.

Alternatively, all parameter subsets in a parameter set 1 are set to "0", and all parameter subsets in a parameter set 2 are set to "0". In other words, all parameter sets include no mapping parameter subset, that is, include no activated parameter subset.

In some embodiments, the mapping relationship may include a mapping relationship between an identifier of the at least one mapping parameter subset and the at least one value of the DCI field.

As shown in FIG. 5, the mapping relationship includes a correspondence between an activated parameter subset 1 and an activated parameter subset 11 and values (000 and 001) of the DCI field.

Alternatively, with reference to FIG. 5, the mapping relationship includes a correspondence between any eight parameter subsets (for example, a parameter subset 1 to a parameter subset 8) in a parameter set and values (000 to 111) of the DCI field. This corresponds to a case in which it is considered by default that each of the at least one parameter subset received by the terminal device by using the second signaling is an activated parameter subset.

Alternatively, with reference to FIG. 6, if it is considered by default that all parameter subsets in a parameter set 1 and a parameter set 2 are in an activated state, a codepoint 1 of the DCI field may correspond to a parameter subset 1a in the parameter set 1, and a codepoint 2 of the DCI field may correspond to a parameter subset 2b in the parameter set 2. Alternatively, a codepoint 1 of the DCI field may correspond to a parameter subset 1a in the parameter set 1, and a codepoint 2 of the DCI field may correspond to a parameter subset 1b in the parameter set 2. Alternatively, a codepoint 1 of the DCI field may correspond to a parameter subset 1a in the parameter set 1, and a codepoint 2 of the DCI field may correspond to a parameter subset 2a in the parameter set 1. Alternatively, a codepoint 1 of the DCI field may correspond to a parameter subset 2a in the parameter set 1, and a codepoint 2 of the DCI field may correspond to a parameter subset 1b in the parameter set 2. This is not limited in this application, and details are not listed one by one herein.

Figure 12:
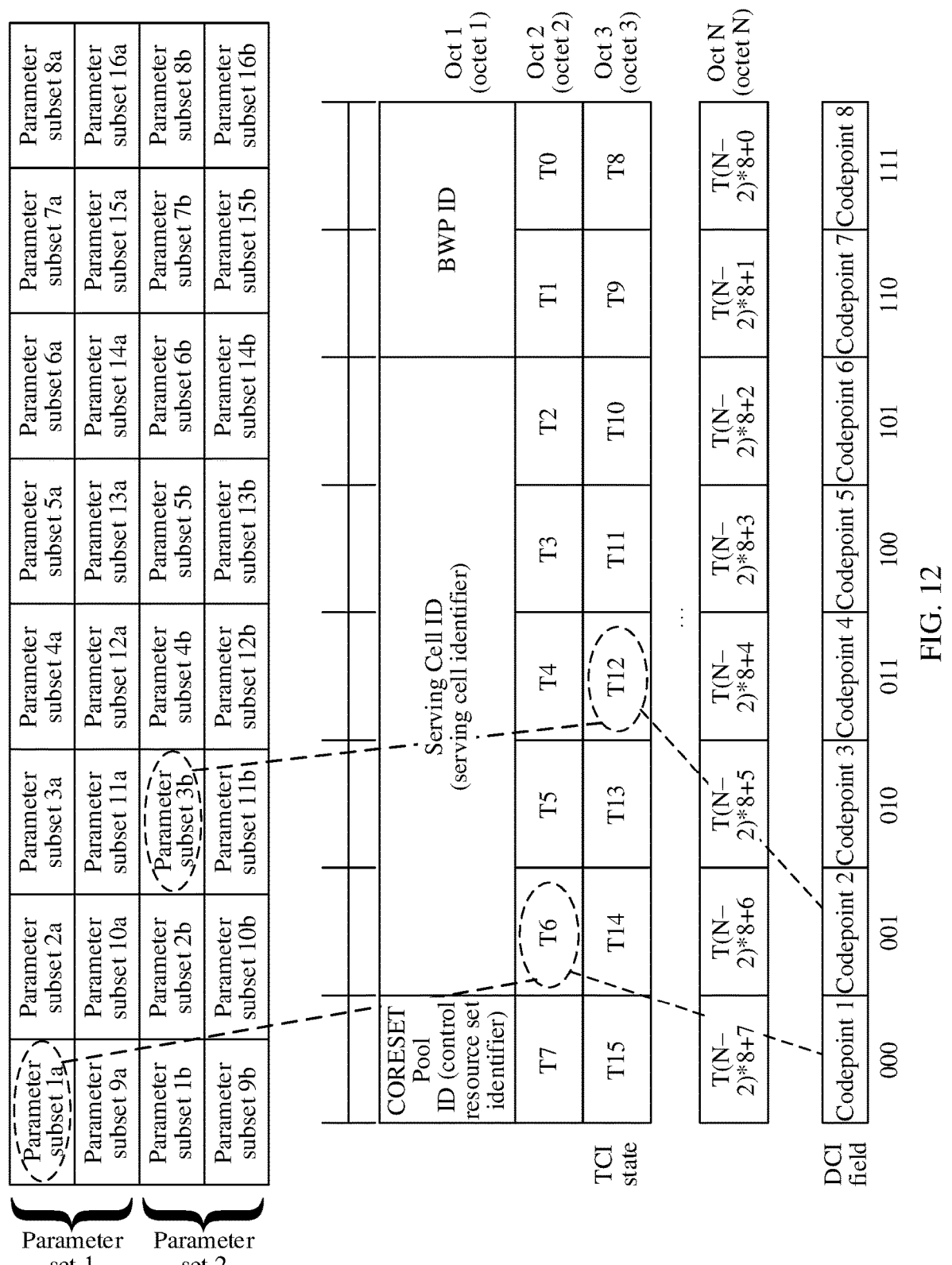
FIG. 12 is a schematic diagram of another mapping relationship according to an embodiment of this application.

It should be noted that, an example corresponding to the case in which it is considered by default that all parameter subsets in a parameter set 1 and a parameter set 2 are in an activated state in FIG. 7 is similar to that in FIG. 12. Details are not described herein again.

Optionally, a value (or referred to as a codepoint) to which a mapping parameter subset is mapped may be determined by an ordinal position of the mapping parameter subset in all the at least one mapping parameter subset. Alternatively, a value to which a mapping parameter subset is mapped may be determined by an activation ranking of the mapping parameter subset in all the at least one mapping parameter subset.

For example, an $m^{th}$ mapping parameter subset in the at least one mapping parameter subset corresponds to an $m^{th}$ value of the DCI field. Herein, m is an ordinal position of the mapping parameter subset in the at least one mapping parameter subset, or m is an activation ranking of the mapping parameter subset in the at least one mapping parameter subset, and m is an integer greater than 0.

Optionally, the at least one mapping parameter subset may be in a one-to-one correspondence with the at least one value of the DCI field. For example, it is assumed that there are M mapping parameter subsets, and the M mapping parameter subsets are in a one-to-one correspondence with M values of the DCI field.

For example, values of the DCI field may be sorted in ascending order, and an $(m+1)^{th}$ value is greater than the $m^{th}$ value.

Alternatively, for example, values of the DCI field may be sorted in descending order, and an $(m+1)^{th}$ value is less than the $m^{th}$ value. This is not limited in this application. An example in which the values of the DCI field are sorted in ascending order is used for description.

For example, m is the ordinal position of the mapping parameter subset in the at least one mapping parameter subset.

With reference to FIG. 5, it is assumed that the at least one mapping parameter subset includes an activated parameter subset 1 and an activated parameter subset 11. An ordinal position of the activated parameter subset 1 in all the mapping parameter subsets (the activated parameter subset 1 and the activated parameter subset 11) is the $1^{st}$, the activated parameter subset 1 is the $1^{st}$ mapping parameter subset, and the activated parameter subset 1 corresponds to the $1^{st}$ value (000). An ordinal position of the activated parameter subset 11 in all the mapping parameter subsets (the activated parameter subset 1 and the activated parameter subset 11) is the $2^{nd}$, the activated parameter subset 11 is the $2^{nd}$ mapping parameter subset, and the activated parameter subset 11 corresponds to the $2^{nd}$ value (001).

With reference to FIG. 6, it is assumed that the at least one mapping parameter subset includes an activated parameter subset 1a and an activated parameter subset 3b, an ordinal position of the activated parameter subset 1a in the activated parameter subset 1a and the activated parameter subset 3b is the $1^{st}$, and the parameter subset 1a corresponds to the $1^{st}$ value (000). An ordinal position of the activated parameter subset 3b in the activated parameter subset 1a and the activated parameter subset 3b is the $2^{nd}$, and the parameter subset 3b corresponds to the $2^{nd}$ value (001).

With reference to FIG. 7, all parameter subsets in a parameter set 1 are non-activated, and a parameter subset 3a in a parameter set 2 is activated. An ordinal position of a parameter subset 1a is the $1^{st}$, and the parameter subset 1a corresponds to the $1^{st}$ value (000).

For example, m is the activation ranking of the mapping parameter subset in the at least one mapping parameter subset.

With reference to FIG. 5, it is assumed that the at least one mapping parameter subset includes an activated parameter subset 1 and an activated parameter subset 11, the parameter subset 1 is first activated, and then the parameter subset 11 is activated. An activation ranking of the activated parameter subset 1 in all the mapping parameter subsets (the activated parameter subset 1 and the activated parameter subset 11) is the $1^{st}$, the activated parameter subset 1 is the $1^{st}$ mapping parameter subset, and the activated parameter subset 1 corresponds to the $1^{st}$ value (000). An activation ranking of the activated parameter subset 11 in all the mapping parameter subsets (the activated parameter subset 1 and the activated parameter subset 11) is the $2^{nd}$, the activated parameter subset 11 is the $2^{nd}$ mapping parameter subset, and the activated parameter subset 11 corresponds to the $2^{nd}$ value (001).

Similarly, if the parameter subset 11 is first activated, and then the parameter subset 1 is activated, the activated parameter subset 11 corresponds to the $1^{st}$ value (000), and the activated parameter subset 1 corresponds to the $2^{nd}$ value (001).

With reference to FIG. 6, a parameter subset 1a is first activated, and then a parameter subset 3b is activated. An activation ranking of the parameter subset 1a in the parameter subset 1a and the activated parameter subset 3b is the $1^{st}$, and an activation ranking of the parameter subset 3b in the parameter subset 1a and the activated parameter subset 3b is the $2^{nd}$. Therefore, the parameter subset 1a corresponds to the $1^{st}$ value (000), and the parameter subset 3b corresponds to the $2^{nd}$ value (001).

With reference to FIG. 7, a parameter subset 3a in a parameter set 2 is activated, an activation ranking of the parameter subset 3a is the $1^{st}$, and the parameter subset 3a corresponds to the $1^{st}$ value (000).

For example, the terminal device may determine, based on the mapping relationship shown in FIG. 5 to FIG. 7, the first mapping parameter subset corresponding to the first TCI state. For example, the first value is 000. With reference to FIG. 5, it can be learned that 000 corresponds to T6. Therefore, it can be learned that the first TCI state is T6. With reference to FIG. 5, it can be learned that 000 is mapped to an activated parameter subset 1. Therefore, the first mapping parameter subset corresponding to the first TCI state T6 is the activated parameter subset 1.

Similarly, with reference to FIG. 6, it can be learned that 000 corresponds to T6. Therefore, it can be learned that the first TCI state is T6. With reference to FIG. 6, it can be learned that 000 is mapped to an activated parameter subset 1a. Therefore, the first mapping parameter subset corresponding to the first TCI state T6 is the activated parameter subset 1a.

Similarly, with reference to FIG. 7, it can be learned that 000 corresponds to T6. Therefore, it can be learned that the first TCI state is T6. With reference to FIG. 7, it can be learned that 000 is mapped to an activated parameter subset 3b. Therefore, the first mapping parameter subset corresponding to the first TCI state T6 is the activated parameter subset 3b.

In some embodiments, one value of the DCI field may be associated with one parameter set. For example, this corresponds to a case in which there are a plurality of parameter sets.

For example, when there are a plurality of parameter sets, a value to which a mapping parameter subset is mapped may be determined by an ordinal position of a parameter set to which the mapping parameter subset belongs in all parameter sets. For example, a mapping parameter set in a parameter set whose ordinal position is the $1^{st}$ may be mapped to the 15 value, and a mapping parameter set in a parameter set whose ordinal position is the $2^{nd}$ may be mapped to the $2^{nd}$ value. This corresponds to a case in which each parameter set includes one mapping parameter set. Details are not listed one by one. A specific example may be shown in FIG. 6, and details are not described herein again.

It should be noted that, if there are a plurality of parameter sets, and a parameter set associated with a value of the DCI field does not include a mapped parameter subset, the value of the DCI field may be mapped to a mapped parameter subset of a next parameter set. A specific example may be shown in FIG. 7, and details are not described herein again. Alternatively, a beam indicated by a TCI state corresponding to the value of the DCI field uses a default power control parameter to transmit a PUCCH, a PUSCH, an SRS, or the like.

For example, the default power control parameter may be a power control parameter obtained according to a specified method for determining a power control parameter when a terminal device does not receive a power control parameter configuration in the conventional technology. Details are not described in this embodiment of this application.

In some other embodiments, the mapping relationship may include a mapping relationship between an identifier of the at least one mapping parameter subset and the at least one activated TCI state.

Figure 11:
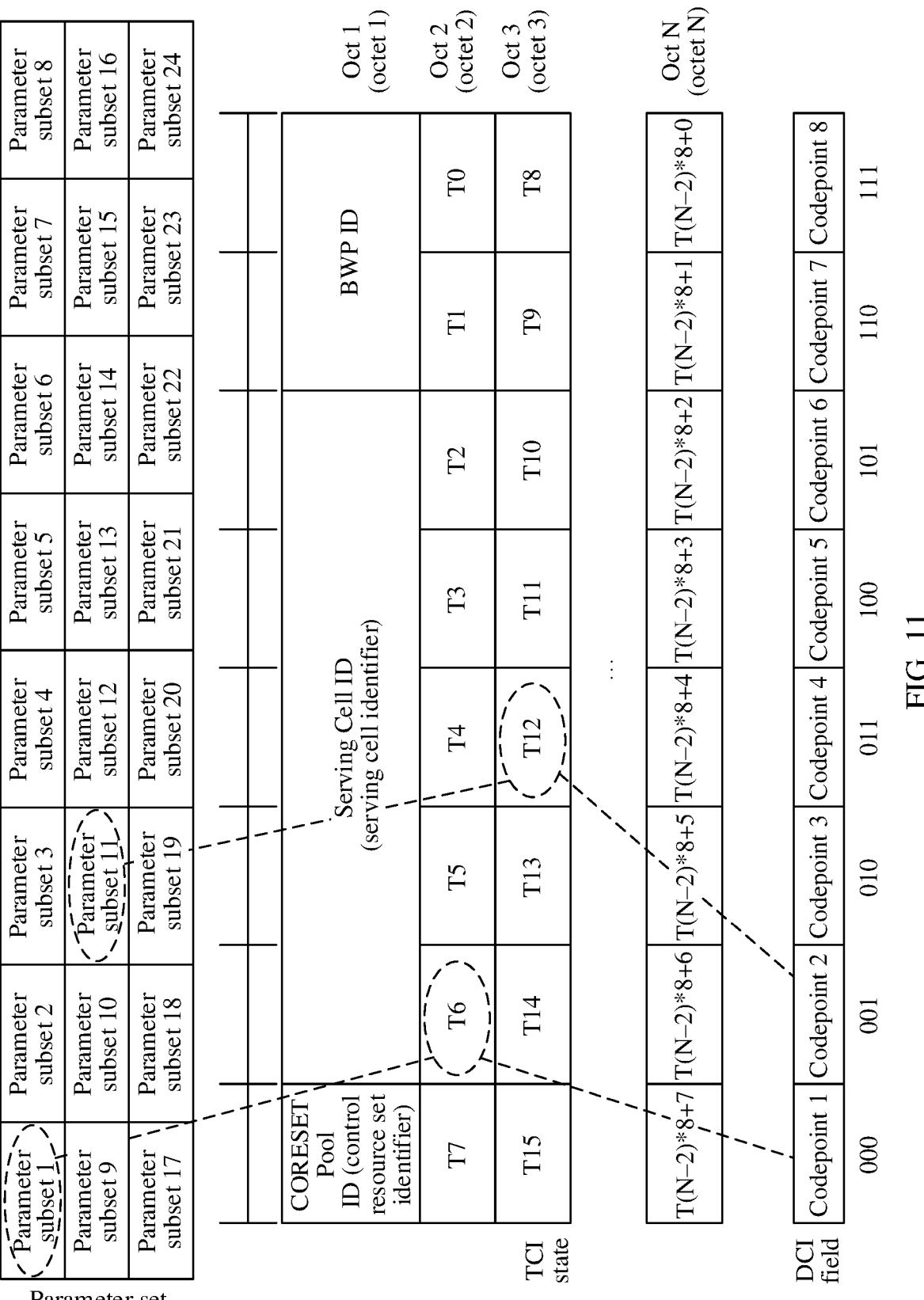
FIG. 11 is a schematic diagram of another mapping relationship according to an embodiment of this application.

As shown in FIG. 11, the mapping relationship includes a correspondence between an activated parameter subset 1 and an activated parameter subset 11 and activated T6 and activated T12.

Alternatively, with reference to FIG. 11, the mapping relationship includes a correspondence between any two parameter subsets in a parameter set and activated T6 and activated T12. This corresponds to a case in which it is considered by default that each of the at least one parameter subset received by the terminal device by using the second signaling is an activated parameter subset.

Alternatively, with reference to FIG. 12, if it is considered by default that all parameter subsets in a parameter set 1 and a parameter set 2 are in an activated state, T6 may correspond to a parameter subset 1a in the parameter set 1, and T12 may correspond to a parameter subset 2b in the parameter set 2. Alternatively, T6 may correspond to a parameter subset 1 a in the parameter set 1, and T12 may correspond to a parameter subset 1b in the parameter set 2. Alternatively, T6 may correspond to a parameter subset 1a in the parameter set 1, and T12 may correspond to a parameter subset 2a in the parameter set 1. Alternatively, T6 may correspond to a parameter subset 2a in the parameter set 1, and T12 may correspond to a parameter subset 1b in the parameter set 2. This is not limited in this application, and details are not listed one by one herein.

It should be noted that, an example corresponding to the case in which it is considered by default that all parameter subsets in a parameter set 1 and a parameter set 2 are in an activated state in FIG. 13 is similar to that in FIG. 12. Details are not described herein again.

Optionally, an activated TCI state to which a mapping parameter subset is mapped is determined by an ordinal position of the mapping parameter subset in all the at least one mapping parameter subset and an ordinal position of the activated TCI state in all activated TCI states.

Alternatively, optionally, an activated TCI state to which a mapping parameter subset is mapped is determined by an activation ranking of the mapping parameter subset in all the at least one mapping parameter subset and an activation ranking of the activated TCI state in all activated TCI states.

For example, a $q^{th}$ mapping parameter subset in the at least one mapping parameter subset corresponds to a $q^{th}$ activated TCI state in the at least one activated TCI state. Herein, q is an ordinal position of the mapping parameter subset in the at least one mapping parameter subset, or an ordinal position of the activated TCI state in the TCI state set. Alternatively, q is an activation ranking of the mapping parameter subset in the at least one mapping parameter subset, or an activation ranking of the activated TCI state in the TCI state set. q is an integer greater than 0.

Optionally, the at least one mapping parameter subset may be in a one-to-one correspondence with the at least one activated TCI state. For example, it is assumed that there are Q mapping parameter subsets, a quantity of the at least one activated TCI state is Q, and the Q mapping parameter subsets are in a one-to-one correspondence with Q values of the DCI field.

For example, q is the ordinal position of the mapping parameter subset in the at least one mapping parameter subset, or the ordinal position of the activated TCI state in the TCI state set.

With reference to FIG. 11, an ordinal position of an activated parameter subset 1 in all mapping parameter subsets (the activated parameter subset 1 and an activated parameter subset 11) is the $1^{st}$, and the activated parameter subset 1 is the $1^{st}$ mapping parameter subset. Similarly, the activated parameter subset 11 is the $2^{nd}$ mapping parameter subset. An ordinal position of activated T6 in all activated TCI states (activated T6 and activated T12) is the $1^{st}$, and T6 is the $1^{st}$ activated TCI state. Similarly, T12 is the $2^{nd}$ activated TCI state. In this case, the activated parameter subset 1 is mapped to T6, and the activated parameter subset 11 is mapped to T12.

With reference to FIG. 12, an activated parameter subset 1a is the $1^{st}$ mapping parameter subset, an activated parameter subset 3b is the $2^{nd}$ mapping parameter subset, T6 is the $1^{st}$ activated TCI state, and T12 is the $2^{nd}$ activated TCI state. In this case, the activated parameter subset 1 is mapped to T6, and the activated parameter subset 11 is mapped to T12.

With reference to FIG. 13, all parameter subsets in a parameter set 1 are non-activated, a parameter subset 3a in a parameter set 2 is an activated parameter subset, and T6 is the $1^{st}$ activated TCI state. In this case, the activated parameter subset 3a is mapped to T6.

For example, q is the activation ranking of the mapping parameter subset in the at least one mapping parameter subset, or the activation ranking of the activated TCI state in the TCI state set.

With reference to FIG. 11, it is assumed that a parameter subset 1 is first activated, and then a parameter subset 2 is activated. If T6 is first activated, and then T12 is activated, the activated parameter subset 1 is mapped to T6, and the activated parameter subset 11 is mapped to T12. It is assumed that a parameter subset 1 is first activated, and then a parameter subset 2 is activated. If T12 is first activated, and then T6 is activated, the activated parameter subset 1 is mapped to T12, and the activated parameter subset 11 is mapped to T6 (this is not shown in FIG. 11).

With reference to FIG. 12, it is assumed that a parameter subset 1 is first activated, and then a parameter subset 2 is activated. If T6 is first activated, and then T12 is activated, the activated parameter subset 1 is mapped to T6, and the activated parameter subset 11 is mapped to T12.

With reference to FIG. 13, all parameter subsets in a parameter set 1 are non-activated, a parameter subset 3a in a parameter set 2 is an activated parameter subset, an activation ranking of the parameter subset 3a is the $1^{st}$, and T6 is the $1^{st}$ activated TCI state. In this case, the activated parameter subset 3a is mapped to T6.

For example, the terminal device may determine, based on the mapping relationship shown in FIG. 11 to FIG. 13, the first mapping parameter subset corresponding to the first TCI state. For example, the first value is 000. With reference to FIG. 11, it can be learned that 000 corresponds to T6. Therefore, it can be learned that the first TCI state is T6. The first TCI state T6 is mapped to an activated parameter subset 1, that is, a first mapping parameter subset corresponding to the first TCI state T6 is the activated parameter subset 1.

Similarly, with reference to FIG. 12, it can be learned that 000 corresponds to T6. Therefore, it can be learned that the first TCI state is T6. The first TCI state T6 is mapped to an activated parameter subset Ta, that is, a first mapping parameter subset corresponding to the first TCI state T6 is an activated parameter subset Ta.

Similarly, with reference to FIG. 13, it can be learned that 000 corresponds to T6. Therefore, it can be learned that the first TCI state is T6. The first TCI state T6 is mapped to an activated parameter subset 3b, that is, a first mapping parameter subset corresponding to the first TCI state T6 is the activated parameter subset 3b.

It should be noted that, if none of all the at least one parameter set (for example, the parameter set shown in FIG. 5 or FIG. 11, or the parameter set 1 and the parameter set 2 shown in FIG. 6, FIG. 7, FIG. 12, or FIG. 13) includes an activated parameter subset, the terminal device may determine that the first mapping parameter subset corresponding to the first TCI state is a default power control parameter. For a specific implementation of the default power control parameter, refer to the foregoing corresponding implementation. Details are not described herein again.

In some scenarios, if the network device updates the fourth signaling but does not update the third signaling, the terminal device determines the first mapping parameter subset corresponding to the first TCI state by using a combination of a parameter subset activated by the last third signaling and updated fourth signaling. Alternatively, if the network device updates the third signaling but does not update the fourth signaling, the terminal device determines the first mapping parameter subset corresponding to the first TCI state by using a combination of a parameter subset activated by updated third signaling and the last fourth signaling.

Optionally, the terminal device may obtain a validity period.

For example, the validity period may be validity period of the updated fourth signaling or the updated third signaling.

For example, the validity period may be defined as X ms or Y symbols after the terminal device receives updated signaling (the updated third signaling or the updated fourth signaling) or the network device receives an ACK (the terminal device determines that the updated third signaling or the updated fourth signaling is received) sent by the terminal device.

For example, the validity period may be specified in a protocol (for example, a minimum value of the validity period is specified), or may be configured by the network device for the terminal device based on a received capability of the terminal device (for example, the validity period is less than or equal to the capability of the terminal device).

In a possible design, the power control parameter determining method provided in this embodiment of this application may further include S307.

S307: The terminal device sends the uplink signal or the uplink channel to the network device. Correspondingly, the network device receives the uplink signal and/or the uplink channel from the terminal device.

For example, the terminal device may send the uplink signal and/or the uplink channel to the network device by using at least one power control parameter in the first mapping parameter subset.

With reference to FIG. 5, it is assumed that the first mapping parameter subset is a parameter subset 1. Therefore, a PUCCH, a PUSCH, an SRS, an uplink positioning reference signal, and/or the like may be sent by using a power control parameter included in the parameter subset 1.

Optionally, the terminal device may determine transmit power of the uplink signal and/or the uplink channel by using the at least one power control parameter in the first mapping parameter subset.

It should be noted that, the foregoing method embodiment is described by using an example in which there is one network device.

Figure 14:
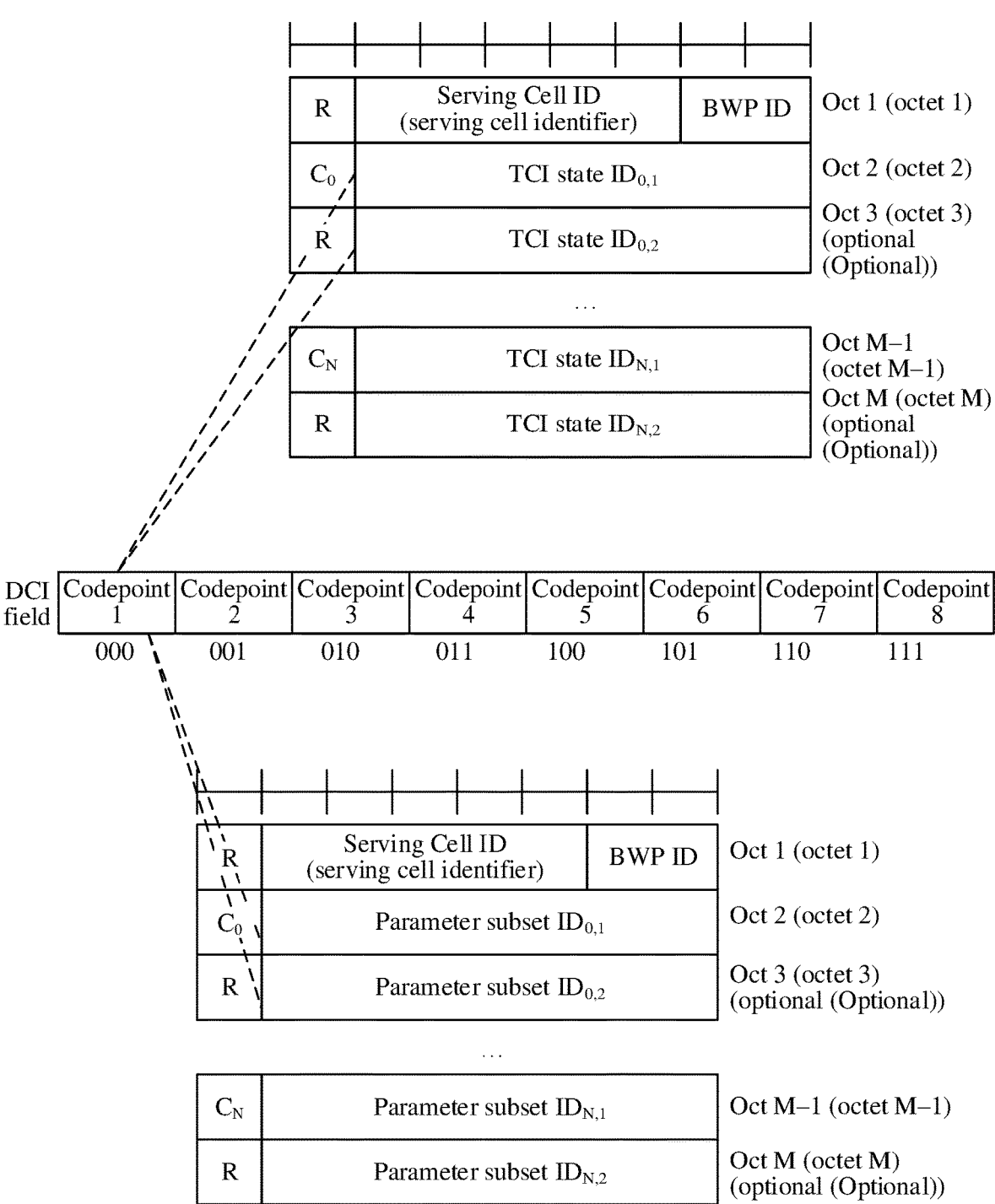
FIG. 14 is a schematic diagram of another mapping relationship according to an embodiment of this application.

The following describes the mapping relationship by using an example in which there are one or more network devices, and a plurality of network devices include a network device 1 and a network device 2. As shown in FIG. 14, in this example, the mapping relationship may include a mapping relationship between an identifier of the at least one mapping parameter subset and the at least one value of the DCI field.

With reference to FIG. 14, for example, the fourth signaling may include a serving cell ID, a BWP ID, a reserved R field, $C_0$ to $C_N$, and a TCI state $ID_{0,2}$ to a TCI state $ID_{N,2}$.

$C_0$ may represent a status of a TCI state $ID_{0,1}$ (or TCI state $ID_{0,2}$). For example, if $C_0$ is set to "1", it indicates that the TCI state $ID_{0,1}$ is activated. Alternatively, it may indicate that the TCI state $ID_{0,2}$ is activated. If $C_0$ is set to "0", it indicates that the TCI state $ID_{0,1}$ is not activated, or may indicate that the TCI state $ID_{0,2}$ is not activated. The TCI state $ID_{0,1}$ indicates an identifier of the $1^{st}$ activated TCI state of the network device 1, and the TCI state $ID_{0,2}$ indicates an identifier of the $1^{st}$ activated TCI state of the network device 2. The TCI state $ID_{0,1}$ and the TCI state $ID_{0,2}$ are mapped to a codepoint 1 (000).

For example, if $C_0$ is set to "1", the TCI state $ID_{0,1}$ is T6, and the TCI state $ID_{0,2}$ is T7, it indicates that the TCI state T6 of the network device 1 is activated, and T7 of the network device 2 is activated. If $C_1$ is set to "1", a TCI state $ID_{1,1}$ is T13, and a TCI state $ID_{1,2}$ is T13, it indicates that T13 of the network device 1 is activated, and T13 of the network device 2 is activated.

Similarly, $C_N$ may represent a status of a TCI state $ID_{N,1}$ (or TCI state $ID_{N,2}$). For example, if $C_N$ is set to "1", it indicates that the TCI state $ID_{N,1}$ is activated, or may indicate that the TCI state $ID_{N,2}$ is activated. If CN is set to "0", it indicates that the TCI state $ID_{N,1}$ is not activated, or may indicate that the TCI state $ID_{N,2}$ is not activated. The TCI state $ID_{N,1}$ indicates an identifier of the $(N+1)^{th}$ activated TCI state of the network device 1, and the TCI state $ID_{N,2}$ indicates an identifier of the $(N+1)^{th}$ activated TCI state of the network device 2. When N is 7, a TCI state $ID_{7,1}$ and a TCI state $ID_{7,2}$ are mapped to a codepoint 8 (111).

It should be noted that, a quantity of network devices in FIG. 14 is not limited in this embodiment of this application.

With reference to FIG. 14, for example, the third signaling may include a serving cell ID, a BWP ID, a reserved field, $C_0$ to $C_N$, and a parameter subset $ID_{0,2}$ to a parameter subset $ID_{N,2}$.

$C_0$ may represent a status of a parameter subset $ID_{0,1}$ (or parameter subset $ID_{0,2}$). For example, if $C_0$ is set to "1", it indicates that the parameter subset $ID_{0,1}$ is activated, or may indicate that the parameter subset $ID_{0,2}$ is activated. If $C_0$ is set to "0", it indicates that the parameter subset $ID_{0,1}$ is not activated, or may indicate that the parameter subset $ID_{0,2}$ is not activated. The parameter subset $ID_{0,1}$ indicates an identifier of the $1^{st}$ activated parameter subset of the network device 1, and the parameter subset $ID_{0,2}$ indicates an identifier of the $1^{st}$ activated parameter subset of the network device 2. The parameter subset $ID_{0,1}$ and the parameter subset $ID_{0,2}$ are mapped to a codepoint 1 (000).

With reference to FIG. 14, if $C_0$ is set to "1", the parameter subset $ID_{0,1}$ is T6, and the parameter subset $ID_{0,2}$ is T7, it indicates that T6 of the network device 1 is activated, and T7 of the network device 2 is activated. If $C_1$ is set to "1", a parameter subset $ID_{1,1}$ is T13, and a parameter subset $ID_{1,2}$ is T13, it indicates that T13 of the network device 1 is activated, and T13 of the network device 2 is activated.

Similarly, $C_N$ may represent a status of a parameter subset $ID_{N,1}$ (or parameter subset $ID_{N,2}$). For example, if $C_N$ is set to "1", it indicates that the parameter subset $ID_{N,1}$ is activated, or may indicate that the parameter subset $ID_{N,2}$ is activated. If $C_N$ is set to "0", it indicates that the parameter subset $ID_{N,1}$ is not activated, or may indicate that the parameter subset $ID_{N,2}$ is not activated. The parameter subset $ID_{N,1}$ indicates an identifier of the $(N+1)^{th}$ activated parameter subset of the network device 1, and the parameter subset $ID_{N,2}$ indicates an identifier of the $(N+1)^{th}$ activated parameter subset of the network device 2. When N is 7, the parameter subset $ID_{N,1}$ and the parameter subset $ID_{N,2}$ are mapped to a codepoint 8 (111).

Figure 15:
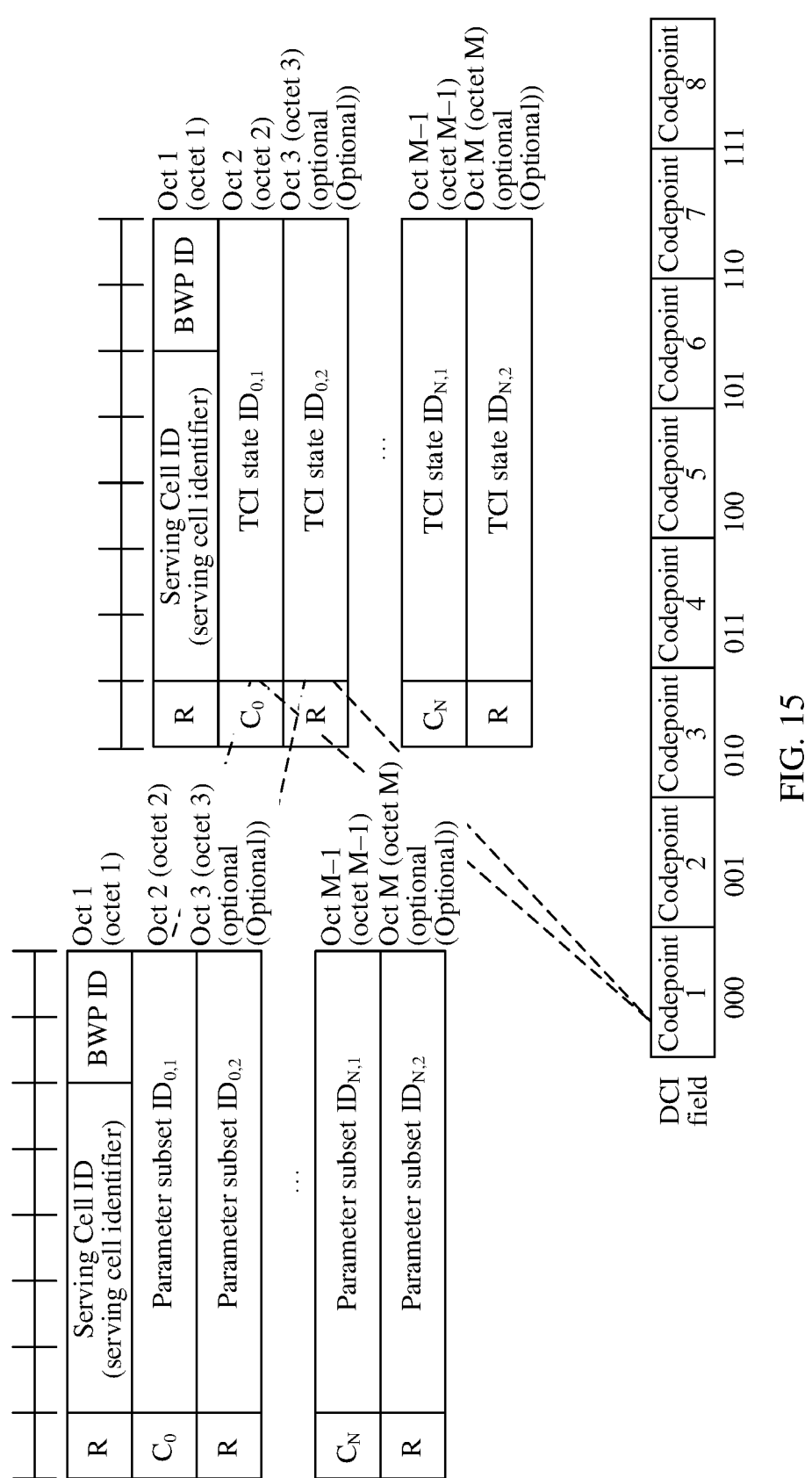
FIG. 15 is a schematic diagram of another mapping relationship according to an embodiment of this application.

The mapping relationship is described by using an example in which a plurality of network devices include a network device 1 and a network device 2. As shown in FIG. 15, in this example, the mapping relationship may include a mapping relationship between an identifier of the at least one mapping parameter subset and the at least one activated TCI state.

With reference to FIG. 15, a parameter subset $ID_{0,1}$ is mapped to a TCI state $ID_{0,1}$, a parameter subset $ID_{0,2}$ is mapped to a TCI state $ID_{0,2}$, and the TCI state $ID_{0,1}$ and the TCI state $ID_{0,2}$ are mapped to a codepoint 1 (000). For other descriptions of FIG. 15, refer to FIG. 14. Details are not described herein again. When N is 7, a parameter subset $ID_{N,1}$ is mapped to a TCI state $ID_{N,1}$, a parameter subset $ID_{N,2}$ is mapped to a TCI state $ID_{N,2}$, and the TCI state $ID_{N,1}$ and the TCI state $ID_{N,2}$ are mapped to a codepoint 8 (111).

In this way, the method provided in this embodiment of this application is applicable to a scenario of communication between a terminal device and a plurality of network devices (which may be referred to as mTRP).

In a possible design, when each of the at least one mapping parameter subset includes the at least one uplink channel and the corresponding power control parameter set, the power control parameter determining method provided in this embodiment of this application may further include: The terminal device determines, based on a parameter offset set and the first mapping parameter subset corresponding to the first TCI state, a first power control parameter set corresponding to the uplink signal.

Optionally, the parameter offset set may include one or more of the following: an offset of nominal power, an offset of a pathloss, and an offset of a pathloss compensation factor.

For a specific implementation of the parameter offset set, refer to S1402. Details are not described herein again.

For example, the uplink signal is an SRS, and the uplink channel is a PUSCH. A mapping parameter subset includes the PUSCH and a corresponding power control parameter set. For example, the power control parameter set includes: P0, $\alpha$, a PL-RS ID, and a closed-loop index. The parameter offset set may include: an offset of nominal power corresponding to the SRS (SRS P0 offset), an offset of a pathloss corresponding to the SRS (SRS PL offset), and an offset of a pathloss compensation factor $\alpha$ corresponding to the SRS (SRS alpha offset).

Therefore, the terminal device may determine, based on a sum of P0 in the power control parameter set and the SRS P0 offset, the nominal power corresponding to the SRS (SRS P0), and determine another power control parameter in a similar manner. Details are not described again. In this way, a first power control parameter set corresponding to the SRS is obtained.

Optionally, there may be one or more parameter offset sets.

Optionally, S301 may include: The plurality of network devices send downlink signaling to the terminal device. Correspondingly, the terminal device receives the plurality of pieces of downlink signaling from the plurality of network devices. For a specific implementation, refer to a corresponding implementation in the following method shown in FIG. 16, and details are not described herein again.

In a possible design, when each of the at least one mapping parameter subset includes the at least one uplink signal and the corresponding power control parameter set, the power control parameter determining method provided in this embodiment of this application may further include: The terminal device determines, based on a parameter offset set and the first mapping parameter subset corresponding to the first TCI state, a first power control parameter set corresponding to the uplink channel. A specific implementation is similar to the foregoing implementation in which the terminal device determines, based on the parameter offset set and the first mapping parameter subset that includes the uplink channel, the first power control parameter set corresponding to the uplink signal. Details are not described herein again.

In a possible design, when each of the at least one mapping parameter subset includes at least one PUSCH and a corresponding power control parameter set, the power control parameter determining method provided in this embodiment of this application may further include: The terminal device determines, based on a parameter offset set and the first mapping parameter subset corresponding to the first TCI state, a first power control parameter set corresponding to a PUCCH. A specific implementation is similar to the foregoing implementation in which the terminal device determines, based on the parameter offset set and the first mapping parameter subset that includes the uplink channel, the first power control parameter set corresponding to the uplink signal. Details are not described herein again.

According to the foregoing power control parameter determining method, the terminal device receives, from the network device, the first signaling that includes the first value of the DCI field, where the first value indicates the first TCI state in the at least one activated TCI state. The terminal device may determine, based on the mapping relationship between the identifier of the at least one mapping parameter subset and the at least one value of the DCI field, that a mapping parameter subset to which the first value is mapped is the first mapping parameter subset corresponding to the first TCI state. Alternatively, the terminal device may determine, based on the mapping relationship between the identifier of the at least one mapping parameter subset and the at least one activated TCI state, the first mapping parameter subset corresponding to the first TCI state. In this way, after receiving the first signaling that indicates the first TCI state, the terminal device may obtain, based on the mapping relationship, the power control parameter set corresponding to the first TCI state. A power control parameter indicator does not need to be exchanged between the terminal device and the network device, so that signaling overheads can be reduced.

In addition, in this application, at least one uplink signal and/or at least one uplink channel and at least one corresponding power control parameter are indicated by using a parameter subset, so that power control parameters can be simply indicated in a unified manner for different uplink transmission scenarios, thereby further reducing signaling overheads.

Figure 16:
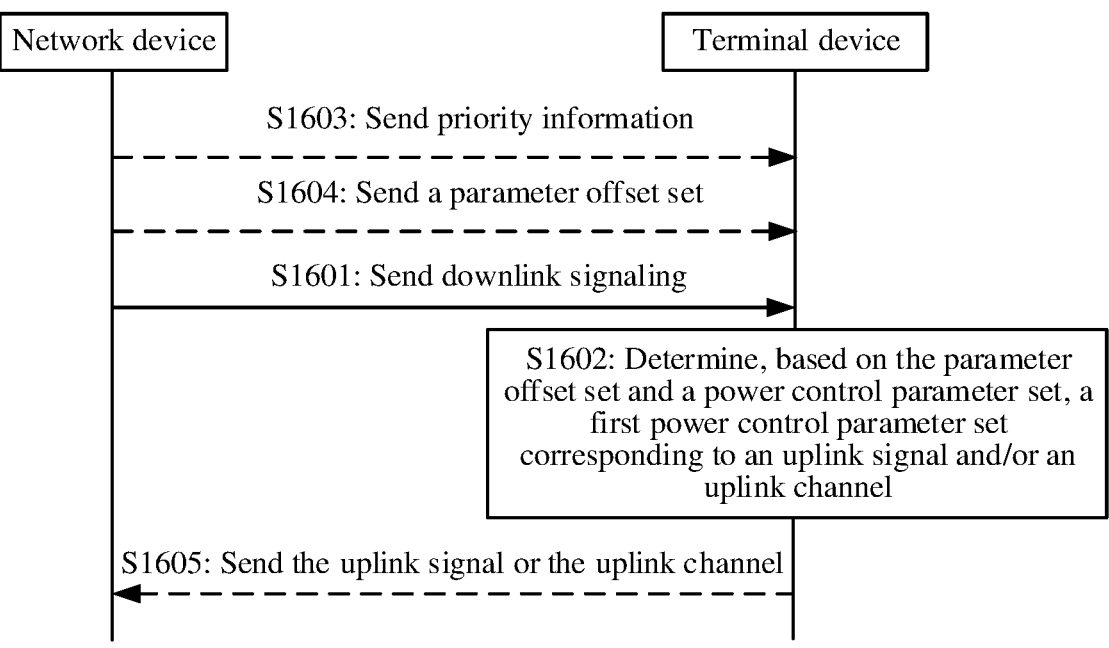
FIG. 16 is a schematic flowchart of another power control parameter determining method according to an embodiment of this application.

For example, FIG. 16 is a schematic flowchart of another power control parameter determining method according to an embodiment of this application. The power control parameter determining method is applicable to communication between the network device and the terminal device shown in FIG. 1.

As shown in FIG. 16, the power control parameter determining method includes the following steps.

S1601: A network device sends downlink signaling to a terminal device. Correspondingly, the terminal device receives the downlink signaling from the network device.

The downlink signaling indicates a TCI state.

Optionally, the downlink signaling may be DCI signaling, for example, any value of a DCI field. For specific description of the DCI field, refer to S301. Details are not described herein again.

For example, the TCI state corresponds to a power control parameter set, and the power control parameter set includes at least one power control parameter.

That the TCI state corresponds to the power control parameter set may mean that the TCI state is mapped to (or associated with) the power control parameter set, or the TCI state includes the power control parameter set.

For example, the at least one power control parameter may include but is not limited to one or more of the following: nominal power P0, a pathloss compensation factor $\alpha$, a pathloss reference signal identifier PL-RS ID, and a closed-loop index.

In some embodiments, the power control parameter set corresponding to the TCI state may be a reference power control parameter set, and the at least one power control parameter in the power control parameter set may be a reference power control parameter.

For example, the power control parameter set corresponding to the TCI state is not associated with an uplink signal or an uplink channel.

In some other embodiments, the power control parameter set corresponding to the TCI state may be a power control parameter set corresponding to an uplink signal or an uplink channel.

Optionally, the uplink signal may include but is not limited to one or more of the following: an SRS and/or an uplink positioning reference signal. The uplink channel may include but is not limited to one or more of the following: a PUSCH and/or a PUCCH.

For example, the power control parameter set includes P0, a, a PL-RS ID, and a closed-loop index. The power control parameter set is associated with the PUSCH, and the power control parameters P0, $\alpha$, PL-RS ID, and closed-loop index are applicable to the PUSCH.

Optionally, the power control parameter in the power control parameter set may be associated with the uplink signal or the uplink channel.

For example, P0, $\alpha$, the PL-RS ID, and the closed-loop index are all associated with the PUSCH.

For another example, P0 is associated with the PUCCH, a is associated with the PUSCH, and the PL-RS ID and the closed-loop index are associated with the SRS.

It should be noted that, a manner of associating the power control parameter with the uplink signal or the uplink channel is not limited in this embodiment of this application. Details are not listed one by one herein.

In a possible design, the power control parameter determining method provided in this embodiment of this application may further include the following step. S1603: The network device sends priority information to the terminal device. Correspondingly, the terminal device receives the priority information from the network device.

Optionally, the priority information may indicate a priority of the power control parameter set corresponding to the TCI state.

For example, the priority information may indicate that a priority of a power control parameter set 1 corresponding to the TCI state is the lowest, or indicate that a priority of a power control parameter set 1 corresponding to the TCI state is lower than that of a power control parameter set 2 corresponding to an SRI indicator.

For example, a power control parameter corresponding to the SRI indicator may be used by the terminal device to send a PUSCH or determine transmit power of the PUSCH. If both the power control parameter corresponding to the SRI indicator and the power control parameter set corresponding to the TCI state exist, the terminal device may preferentially determine transmit power of a PUSCH by using the power control parameter corresponding to the SRI indicator, to send the PUSCH.

Optionally, the SRI indicator may be configured by the network device for the terminal device by using DCI signaling. The SRI indicator corresponds to the power control parameter set.

It should be noted that, a sequence of S1603 and S1601 is not limited in this embodiment of this application. S1603 and S1601 may be performed in a same step. For example, the downlink signaling indicates the TCI state, and includes the priority information.

S1602: The terminal device determines, based on a parameter offset set and the power control parameter set, a first power control parameter set corresponding to the uplink signal and/or the uplink channel.

The parameter offset set may include the uplink signal and/or the uplink channel and a corresponding offset of at least one power control parameter.

Optionally, the offset of the at least one power control parameter may include one or more of the following: an offset of nominal power (P0 offset), an offset of a pathloss PL, an offset of nominal power during uplink grant-free transmission (P0-nominal without grant offset), and an offset of a pathloss compensation factor $\alpha$.

The offset of the nominal power during uplink grant-free transmission may be referred to as an offset of nominal power of semi-persistent scheduling (SPS).

The following describes the parameter offset set by using an example in which the uplink signal includes an SRS, the uplink channel includes a PUSCH and a PUCCH, and the offset of the power control parameter includes the offset of the nominal power (P0 offset), the offset of the pathloss PL, and the offset of the pathloss compensation factor $\alpha$.

For example, the parameter offset set may include one or more of the following: an offset of nominal power corresponding to the SRS (SRS P0 offset), an offset of a pathloss corresponding to the SRS (SRS PL offset), and an offset of a pathloss compensation factor $\alpha$ corresponding to the SRS (SRS alpha offset). This may be applicable to a case in which the power control parameter set corresponding to the TCI state is the reference power control parameter set, or the power control parameter in the power control parameter set is associated with the PUSCH or the PUCCH.

Therefore, the terminal device may determine, based on a sum of P0 in the power control parameter set and the SRS P0 offset, the nominal power corresponding to the SRS (SRS P0), and determine another power control parameter in a similar manner. Details are not described again. In this way, a first power control parameter set corresponding to the SRS is obtained.

It should be noted that, when the parameter offset set does not include an offset of one or more power control parameters corresponding to the SRS, a corresponding power control parameter in the power control parameter set may be determined as the one or more power control parameters corresponding to the SRS. For example, the parameter offset set includes the SRS PL offset and the SRS alpha offset, and does not include the SRS P0 offset, and P0 in the power control parameter set may be determined as P0 of the SRS.

For another example, the parameter offset set may include one or more of the following: an offset of nominal power corresponding to the PUSCH (PUSCH P0 offset), an offset of a pathloss corresponding to the PUSCH (PUSCH PL offset), and an offset of a pathloss compensation factor $\alpha$ corresponding to the PUSCH (PUSCH alpha offset). This may be applicable to a case in which the power control parameter set corresponding to the TCI state is the reference power control parameter set, or the power control parameter in the power control parameter set is associated with the SRS or the PUCCH.

Therefore, the terminal device may determine, based on a sum of a in the power control parameter set and the PUSCH u offset, a corresponding to the PUSCH (PUSCH a), and determine another power control parameter in a similar manner. Details are not described again. In this way, a first power control parameter set corresponding to the PUSCH is obtained.

It should be noted that, when the parameter offset set does not include an offset of one or more power control parameters corresponding to the PUSCH, a corresponding power control parameter in the power control parameter set may be determined as the one or more power control parameters corresponding to the PUSCH. For example, the parameter offset set includes the PUSCH PL offset and the PUSCH alpha offset, and does not include the PUSCH P0 offset, and P0 in the power control parameter set may be determined as P0 of the PUSCH.

For another example, the parameter offset set may include one or more of the following: an offset of nominal power corresponding to the PUCCH (PUCCH P0 offset), and an offset of a pathloss corresponding to the PUCCH (PUCCH PL offset). This may be applicable to a case in which the power control parameter set corresponding to the TCI state is the reference power control parameter set, or the power control parameter in the power control parameter set is associated with the SRS or the PUSCH.

Therefore, the terminal device may determine, based on a sum of PL in the power control parameter set and the PUCCH PL offset, a pathloss corresponding to the PUCCH (PUCCH PL), and determine another power control parameter in a similar manner. Details are not described again. In this way, a first power control parameter set corresponding to the PUCCH is obtained.

It should be noted that, when the parameter offset set does not include an offset of one or more power control parameters corresponding to the PUCCH, a corresponding power control parameter in the power control parameter set may be determined as the one or more power control parameters corresponding to the PUCCH. For example, the parameter offset set includes the PUCCH PL offset, and does not include the PUCCH P0 offset, and P0 in the power control parameter set may be determined as P0 of the PUCCH.

For another example, the parameter offset set may include one or more of the following: an offset of nominal power corresponding to the SRS (SRS P0 offset), an offset of a pathloss corresponding to the SRS (SRS PL offset), an offset of a pathloss compensation factor $\alpha$ corresponding to the SRS (SRS alpha offset), an offset of nominal power corresponding to the PUSCH (PUSCH P0 offset), an offset of a pathloss corresponding to the PUSCH (PUSCH PL offset), an offset of a pathloss compensation factor $\alpha$ corresponding to the PUSCH (PUSCH alpha offset), an offset of nominal power corresponding to the PUCCH (PUCCH P0 offset), and an offset of a pathloss corresponding to the PUCCH (PUCCH PL offset). This may be applicable to a case in which the power control parameter set corresponding to the TCI state is the reference power control parameter set, or the power control parameter in the power control parameter set is associated with another uplink signal or uplink channel, for example, an uplink positioning reference signal.

Therefore, the terminal device may determine, based on a sum of P0 in the power control parameter set and the SRS P0 offset, the nominal power corresponding to the SRS (SRS P0), and determine another power control parameter in a similar manner. Details are not described again. In this way, first power control parameter sets respectively corresponding to the SRS, the PUSCH, and the PUCCH are obtained.

For another example, the parameter offset set may include one or more of the following: an offset of nominal power corresponding to the SRS (SRS P0 offset), an offset of a pathloss compensation factor $\alpha$ corresponding to the SRS (SRS alpha offset), an offset of nominal power corresponding to the PUSCH (PUSCH P0 offset), an offset of a pathloss corresponding to the PUSCH (PUSCH PL offset), and an offset of a pathloss corresponding to the PUCCH (PUCCH PL offset). This may be applicable to a case in which the power control parameter in the power control parameter set is associated with the uplink signal or the uplink channel. For example, P0 is associated with the PUCCH, a is associated with the PUSCH, and the PL-RS ID and the closed-loop index are associated with the SRS.

Therefore, the terminal device may determine, based on a sum of P0 associated with the PUCCH in the power control parameter set and the SRS P0 offset, the nominal power corresponding to the SRS (SRS P0), and does not need to determine the nominal power corresponding to the PUCCH. Signaling overheads of the terminal device can be reduced, and another power control parameter is determined in a similar manner. Details are not described one by one. In this way, first power control parameter sets respectively corresponding to the SRS, the PUSCH, and the PUCCH are obtained.

It should be noted that, an implementation of the parameter offset set is not limited in this embodiment of this application. For another example, the parameter offset set may include one or more of the following: an offset of nominal power corresponding to the SRS, the PUSCH, and the PUCCH (SRS P0 offset), an offset of pathlosses corresponding to the SRS, the PUSCH, and the PUCCH (SRS PL offset), and an offset of pathloss compensation factors $\alpha$ corresponding to the SRS and the PUSCH (SRS alpha offset). That is, different power control parameters may correspond to a same offset.

Optionally, there may be one or more parameter offset sets.

Optionally, S1601 may include: The plurality of network devices send downlink signaling to the terminal device. Correspondingly, the terminal device receives the plurality of pieces of downlink signaling from the plurality of network devices.

The downlink signaling may indicate a TCI state.

For example, a network device 1 sends downlink signaling 1 to the terminal device, and the terminal device receives the downlink signaling 1 from the network device 1. The downlink signaling 1 indicates a TCI state 1. A network device 2 sends downlink signaling 2 to the terminal device, and the terminal device receives the downlink signaling 2 from the network device 2. The downlink signaling 2 indicates a TCI state 2.

For example, the TCI state 1 corresponds to a power control parameter set 1, and the TCI state 2 corresponds to a power control parameter set 2.

In other words, the method provided in this embodiment of this application is applicable to a scenario of communication between a terminal device and a plurality of network devices (which may be referred to as mTRP).

When there is one parameter offset set, the terminal device may determine, based on the power control parameter set 1 and the parameter offset set, a first power control parameter set corresponding to an uplink signal and/or an uplink channel (an uplink signal and/or an uplink channel corresponding to the network device 1). The terminal device may determine, based on the power control parameter set 2 and the parameter offset set, a first power control parameter set corresponding to an uplink signal and/or an uplink channel (an uplink signal and/or an uplink channel corresponding to the network device 2).

Optionally, when there are a plurality of parameter offset sets, the plurality of parameter offset sets may be in a one-to-one correspondence with the plurality of network devices.

For example, a parameter offset set 1 and a parameter offset set 2 are used as an example. It is assumed that the parameter offset set 1 corresponds to the network device 1, and the parameter offset set 2 corresponds to the network device 2. The terminal device may determine, based on the power control parameter set 1 and the parameter offset set 1, a first power control parameter set corresponding to an uplink signal and/or an uplink channel (an uplink signal and/or an uplink channel corresponding to the network device 1). The terminal device may determine, based on the power control parameter set 2 and the parameter offset set 2, a first power control parameter set corresponding to an uplink signal and/or an uplink channel (an uplink signal and/or an uplink channel corresponding to the network device 2).

Optionally, the power control parameter determining method provided in this embodiment of this application may further include S1604. S1604: The network device sends the parameter offset set to the terminal device. Correspondingly, the terminal device receives the parameter offset set from the network device.

For example, the parameter offset set may be preconfigured by using RRC signaling.

Optionally, the power control parameter determining method provided in this embodiment of this application may further include: The network device determines the parameter offset set. For example, an offset of the at least one power control parameter corresponding to the uplink signal and/or the uplink channel may be determined by the network device.

In a possible design, the power control parameter determining method provided in this embodiment of this application may further include S1605.

S1605: The terminal device sends the uplink signal and/or the uplink channel to the network device. Correspondingly, the network device receives the uplink signal and/or the uplink channel from the terminal device.

For example, the terminal device may send the uplink signal and/or the uplink channel to the network device by using at least one power control parameter in the first power control parameter set.

Optionally, the terminal device may determine transmit power of the uplink signal and/or the uplink channel by using the at least one power control parameter in the first power control parameter set.

In some scenarios, if the terminal device does not receive the parameter offset set, the terminal device may directly determine uplink transmit power or send the uplink signal and/or the uplink channel to the network device based on a power control parameter set indicated by/associated with a TCI, and/or based on a power control parameter indicated by an SRI, and/or based on a power control parameter indicated by a transmit power control (TPC) field included in DCI signaling.

According to the foregoing power control parameter determining method, the terminal device may determine, based on the power control parameter set corresponding to the TCI state and the offset of the at least one power control parameter, the at least one power control parameter corresponding to the uplink signal and/or the uplink channel. In this way, differentiated power control parameter indication can be implemented without increasing complexity of power control parameter indication, and this may be applied to different uplink transmission scenarios.

The foregoing describes in detail the power control parameter determining method in embodiments of this application with reference to FIG. 3 to FIG. 16. The following describes in detail a power control parameter determining apparatus in embodiments of this application with reference to FIG. 17 and FIG. 18.

Figure 17:
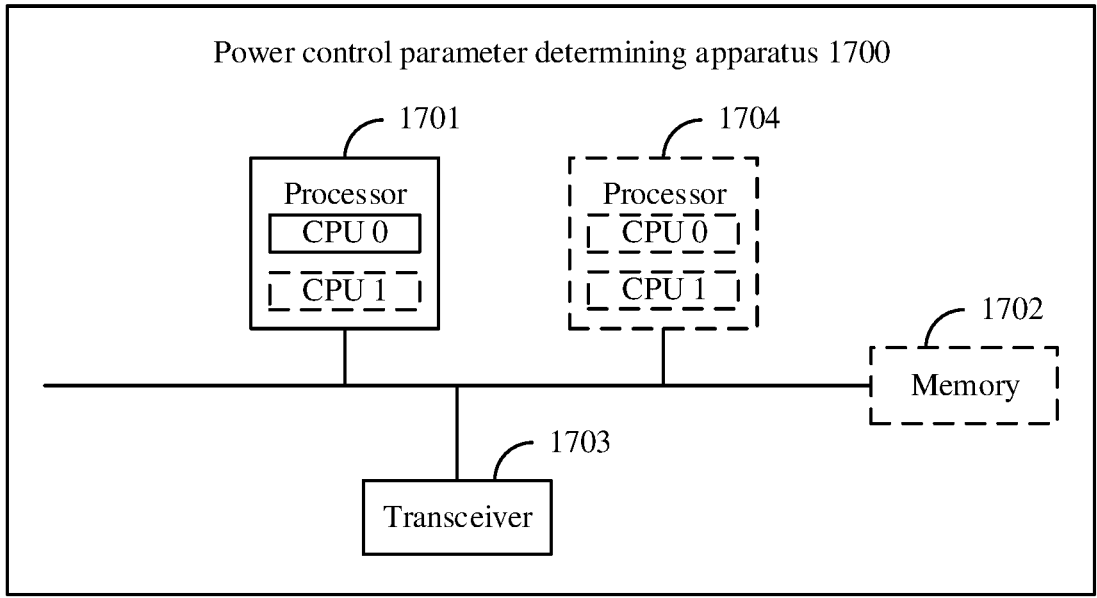
FIG. 17 is a schematic diagram of a structure of a power control parameter determining apparatus according to an embodiment of this application.

FIG. 17 is a schematic diagram of a structure of a power control parameter determining apparatus that can be configured to perform the power control parameter determining method provided in embodiments of this application. The power control parameter determining apparatus 1700 may be a terminal device or a network device, or may be a chip used in the terminal device or the network device, or another component having a corresponding function. As shown in FIG. 17, the power control parameter determining apparatus 1700 may include a processor 1701 and a transceiver 1703, and may further include a memory 1702. The processor 1701 is coupled to the memory 1702 and the transceiver 1703, for example, through a communication bus, or the processor 1701 may be independently used.

The following specifically describes each component of the power control parameter determining apparatus 1700 with reference to FIG. 17.

The processor 1701 is a control center of the power control parameter determining apparatus 1700, and may be one processor, or may be a collective term of a plurality of processing elements. For example, the processor 1701 is one or more central processing units (CPU), may be an application-specific integrated circuit (ASIC), or may be configured as one or more integrated circuits that implement embodiments of this application, for example, one or more microprocessors (DSP), or one or more field programmable gate arrays (FPGA).

The processor 1701 may run or execute a software program stored in the memory 1702 and invoke data stored in the memory 1702, to perform various functions of the power control parameter determining apparatus 1700.

In specific implementation, in an embodiment, the processor 1701 may include one or more CPUs, for example, a CPU 0 and a CPU 1 shown in FIG. 17.

In specific implementation, in an embodiment, the power control parameter determining apparatus 1700 may alternatively include a plurality of processors, for example, the processor 1701 and a processor 1704 shown in FIG. 17. Each of the processors may be a single-core processor (single-CPU) or a multi-core processor (multi-CPU). The processor herein may be one or more communication devices, circuits, and/or processing cores configured to process data (for example, computer program instructions).

The memory 1702 may be a read-only memory (ROM) or another type of static storage communication device capable of storing static information and instructions, or may be a random access memory (RAM) or another type of dynamic storage communication device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage communication device, or any other medium capable of carrying or storing expected program code in a form of an instruction or a data structure and capable of being accessed by a computer. However, this is not limited. The memory 1702 may be integrated with the processor 1701, or may exist independently and is coupled to the processor 1701 by using an input/output interface (not shown in FIG. 17) of the power control parameter determining apparatus 1700. This is not specifically limited in this embodiment of this application.

For example, the input port may be configured to implement a receiving function performed by the terminal device or the network device in any one of the foregoing method embodiments, and the output port may be configured to implement a sending function performed by the terminal device or the network device in any one of the foregoing method embodiments.

The memory 1702 is configured to store a software program for performing the solution in this application, and the processor 1701 controls execution. For a specific implementation, refer to the method embodiments. Details are not described herein again.

The transceiver 1703 is configured to communicate with another power control parameter determining apparatus. For example, when the power control parameter determining apparatus 1700 is a terminal device, the transceiver 1703 may be configured to communicate with a network device. For another example, when the power control parameter determining apparatus 1700 is a network device, the transceiver 1703 may be configured to communicate with a terminal device. In addition, the transceiver 1703 may include a receiver and a transmitter (not separately shown in FIG. 17). The receiver is configured to implement a receiving function, and the transmitter is configured to implement a sending function. The transceiver 1703 may be integrated with the processor 1701, or may exist independently and is coupled to the processor 1701 by using an input/output interface (not shown in FIG. 17) of the power control parameter determining apparatus 1700. This is not specifically limited in this embodiment of this application.

It should be noted that, the structure of the power control parameter determining apparatus 1700 shown in FIG. 17 does not constitute a limitation on the power control parameter determining apparatus. An actual power control parameter determining apparatus may include more or fewer components than those shown in the figure, or combine some components, or have different component arrangements.

The actions of the terminal device in steps S302, S307, S1602, and S1605 may be performed by the terminal device instructed by the processor 1701 in the power control parameter determining apparatus 1700 shown in FIG. 17 by invoking the application program code stored in the memory 1702.

The actions of the network device in steps S301, S303 to S306, S1601, S1603, and S1604 may be performed by the network device instructed by the processor 1701 in the power control parameter determining apparatus 1700 shown in FIG. 17 by invoking the application program code stored in the memory 1702. This is not limited in this embodiment.

Figure 18:
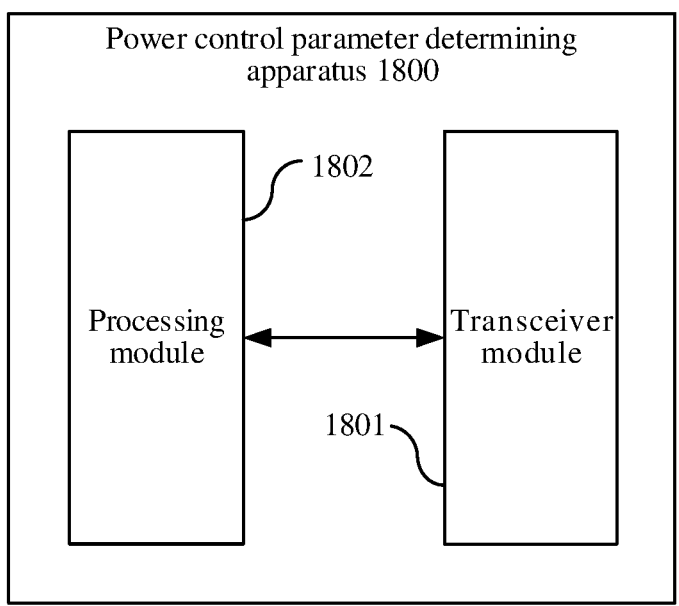
FIG. 18 is a schematic diagram of a structure of another power control parameter determining apparatus according to an embodiment of this application.

FIG. 18 is a schematic diagram of a structure of another power control parameter determining apparatus according to an embodiment of this application. For ease of description, FIG. 18 shows only main components of the power control parameter determining apparatus.

The power control parameter determining apparatus 1800 includes a transceiver module 1801 and a processing module 1802. The power control parameter determining apparatus 1800 may be the terminal device or the network device in the foregoing method embodiment. The transceiver module 1801 may also be referred to as a transceiver unit, and is configured to implement sending and receiving functions performed by the terminal device or the network device in any one of the foregoing method embodiments.

It should be noted that, the transceiver module 1801 may include a receiving module and a sending module (not shown in FIG. 18). The receiving module is configured to receive data and/or signaling from the terminal device. The sending module is configured to send data and/or signaling to the terminal device. A specific implementation of the transceiver module is not specifically limited in this application. The transceiver module may include a transceiver circuit, a transceiver machine, a transceiver, or a communication interface.

The processing module 1802 may be configured to implement a processing function performed by the terminal device or the network device in any one of the foregoing method embodiments. The processing module 1802 may be a processor.

In this embodiment, the power control parameter determining apparatus 1800 is presented in a form in which function module division is performed in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the power control parameter determining apparatus 1800 may be in a form of the power control parameter determining apparatus 1700 shown in FIG. 17.

For example, the processor 1701 in the power control parameter determining apparatus 1700 shown in FIG. 17 may invoke the computer-executable instructions stored in the memory 1702, so that the power control parameter determining method in the foregoing method embodiments is performed.

Specifically, a function/an implementation process of the transceiver module 1801 and the processing module 1802 in FIG. 18 may be implemented by invoking, by the processor 1701 in the power control parameter determining apparatus 1700 shown in FIG. 17, the computer-executable instructions stored in the memory 1702. Alternatively, a function/an implementation process of the processing module 1802 in FIG. 18 may be implemented by invoking, by the processor 1701 in the power control parameter determining apparatus 1700 shown in FIG. 17, the computer-executable instructions stored in the memory 1702, and a function/an implementation process of the receiving module and the sending module in FIG. 18 may be implemented by using the transceiver 1703 in the power control parameter determining apparatus 1700 shown in FIG. 17.

Because the power control parameter determining apparatus 1800 provided in this embodiment may perform the foregoing power control parameter determining method, for technical effects that can be achieved, refer to the foregoing method embodiments. Details are not described herein again.

In a possible design, the power control parameter determining apparatus 1800 shown in FIG. 18 is applicable to the communication system shown in FIG. 1, and performs a function of the terminal device in the power control parameter determining method shown in FIG. 3.

The transceiver module 1801 is configured to receive first signaling from a network device. The first signaling includes a first value of a DCI field, and the first value indicates a first transmission configuration indicator TCI state in at least one activated TCI state.

The processing module 1802 is configured to determine, based on a mapping relationship, a first mapping parameter subset corresponding to the first TCI state. The mapping relationship includes a mapping relationship between an identifier of at least one mapping parameter subset and at least one value of the DCI field, or a mapping relationship between an identifier of at least one mapping parameter subset and the at least one activated TCI state. The first mapping parameter subset is one of the at least one mapping parameter subset, each of the at least one mapping parameter subset includes at least one uplink signal and/or at least one uplink channel and a corresponding power control parameter set, the power control parameter set includes at least one power control parameter, and the first value is one of the at least one value of the DCI field.

Optionally, the power control parameter determining apparatus 1800 may further include a storage module (not shown in FIG. 18). The storage module stores a program or instructions. When the processing module 1802 executes the program or the instructions, the power control parameter determining apparatus 1800 is enabled to perform a function of the terminal device in the power control parameter determining method shown in FIG. 3.

It should be noted that, the power control parameter determining apparatus 1800 may be a terminal device, or may be a chip (system) or another part or component that can be disposed in the terminal device. This is not limited in this application.

In addition, for technical effects of the power control parameter determining apparatus 1800, refer to the technical effects of the power control parameter determining method shown in FIG. 3. Details are not described herein again.

In another possible design, the power control parameter determining apparatus 1800 shown in FIG. 18 is applicable to the communication system shown in FIG. 1, and performs a function of the network device in the power control parameter determining method shown in FIG. 3.

The processing module 1802 is configured to determine at least one parameter set. Each of the at least one parameter set includes at least one parameter subset, each of the at least one parameter subset includes at least one uplink signal and/or at least one uplink channel and a corresponding power control parameter set, and the power control parameter set includes at least one power control parameter.

The transceiver module 1801 is configured to send second signaling to a terminal device. The second signaling includes the at least one parameter set.

Optionally, the power control parameter determining apparatus 1800 may further include a storage module (not shown in FIG. 18). The storage module stores a program or instructions. When the processing module 1802 executes the program or the instructions, the power control parameter determining apparatus 1800 is enabled to perform a function of the network device in the power control parameter determining method shown in FIG. 3.

It should be noted that, the power control parameter determining apparatus 1800 may be a network device, or may be a chip (system) or another part or component that can be disposed in the network device. This is not limited in this application.

In addition, for technical effects of the power control parameter determining apparatus 1800, refer to the technical effects of the power control parameter determining method shown in FIG. 3. Details are not described herein again.

In another possible design, the power control parameter determining apparatus 1800 shown in FIG. 18 is applicable to the communication system shown in FIG. 1, and performs a function of the terminal device in the power control parameter determining method shown in FIG. 16.

The transceiver module 1801 is configured to receive downlink signaling from a network device. The downlink signaling indicates a TCI state, the TCI state corresponds to a power control parameter set, and the power control parameter set includes the at least one power control parameter.

The processing module 1802 is configured to determine, based on a parameter offset set and the power control parameter set, a first power control parameter set corresponding to an uplink signal and/or an uplink channel. The parameter offset set includes an uplink signal and/or an uplink channel and a corresponding offset of at least one power control parameter.

Optionally, the power control parameter determining apparatus 1800 may further include a storage module (not shown in FIG. 18). The storage module stores a program or instructions. When the processing module 1802 executes the program or the instructions, the power control parameter determining apparatus 1800 is enabled to perform a function of the terminal device in the power control parameter determining method shown in FIG. 16.

It should be noted that, the power control parameter determining apparatus 1800 may be a terminal device, or may be a chip (system) or another part or component that can be disposed in the terminal device. This is not limited in this application.

In addition, for technical effects of the power control parameter determining apparatus 1800, refer to the technical effects of the power control parameter determining method shown in FIG. 16. Details are not described herein again.

In another possible design, the power control parameter determining apparatus 1800 shown in FIG. 18 is applicable to the communication system shown in FIG. 1, and performs a function of the network device in the power control parameter determining method shown in FIG. 16.

The processing module 1802 is configured to determine a parameter offset set. The parameter offset set includes an uplink signal and/or an uplink channel and a corresponding offset of at least one power control parameter.

The transceiver module 1801 is configured to send the parameter offset set to a terminal device.

Optionally, the power control parameter determining apparatus 1800 may further include a storage module (not shown in FIG. 18). The storage module stores a program or instructions. When the processing module 1802 executes the program or the instructions, the power control parameter determining apparatus 1800 is enabled to perform a function of the network device in the power control parameter determining method shown in FIG. 16.

It should be noted that, the power control parameter determining apparatus 1800 may be a network device, or may be a chip (system) or another part or component that can be disposed in the network device. This is not limited in this application.

In addition, for technical effects of the power control parameter determining apparatus 1800, refer to the technical effects of the power control parameter determining method shown in FIG. 16. Details are not described herein again.

An embodiment of this application provides a communication system. The communication system includes a terminal device and a network device.

The terminal device is configured to perform an action of the terminal device in the foregoing method embodiments. For a specific execution method and process, refer to the foregoing method embodiments. Details are not described herein again.

The network device is configured to perform an action of the network device in the foregoing method embodiments. For a specific execution method and process, refer to the foregoing method embodiments. Details are not described herein again.

An embodiment of this application provides a chip system. The chip system includes a processor and an input/output port. The processor may be configured to implement a processing function related to the power control parameter determining method provided in embodiments of this application, and the input/output port may be configured to implement sending and receiving functions related to the power control parameter determining method provided in embodiments of this application.

For example, the input port may be configured to implement the receiving function related to the power control parameter determining method provided in embodiments of this application, and the output port may be configured to implement the sending function related to the power control parameter determining method provided in embodiments of this application.

In a possible design, the chip system further includes a memory. The memory is configured to store program instructions and data for implementing functions related to the power control parameter determining method provided in embodiments of this application.

The chip system may include a chip, or may include a chip and another discrete component.

An embodiment of this application provides a computer-readable storage medium. The computer-readable storage medium includes a computer program or instructions. When the computer program or the instructions are run on a computer, the power control parameter determining method provided in embodiments of this application is performed.

An embodiment of this application provides a computer program product. The computer program product includes a computer program or instructions. When the computer program or the instructions are run on a computer, the power control parameter determining method provided in embodiments of this application is performed.

It should be understood that, the processor in embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any combination thereof. When software is used to implement embodiments, the foregoing embodiments may be implemented completely or partially in a form of a computer program product. The computer program product includes one or more computer instructions or computer programs. When the computer instructions or computer programs are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists, where A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c, where a, b, and c may be singular or plural.

It should be understood that in embodiments of this application, sequence numbers of processes do not mean a sequence of execution. The sequence of execution of the processes should be determined according to functions and internal logic of the processes, and should not constitute any limitation on an implementation process of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A power control parameter determining method, comprising:

receiving first signaling from a network device, wherein the first signaling comprises a first value of a downlink control information (DCI) field, the first value indicates an activated first transmission configuration indicator (TCI) state, and the first TCI state comprises an identifier of a power control parameter set; and determining, based on a mapping relationship, a first parameter subset corresponding to the first TCI state, wherein:

the mapping relationship comprises a mapping relationship between an identifier of at least one parameter subset and at least one TCI state, the at least one TCI state comprises the first TCI state, the first parameter subset is one of the at least one parameter subset, each of the at least one parameter subset comprises at least one power control parameter set corresponding to an uplink signal or an uplink channel, and the power control parameter set comprises at least one power control parameter, wherein the uplink signal or uplink channel is in a one-to-one correspondence with the at least one power control parameter set.

2. The power control parameter determining method according to claim 1, wherein the mapping relationship between the identifier of the at least one parameter subset and the at least one TCI state comprises a mapping relationship between an identifier of the at least one power control parameter and the at least one TCI state, or a mapping relationship between an identifier of at least one pathloss reference signal and the at least one TCI state.

3. The power control parameter determining method according to claim 1, wherein the method further comprises:

receiving the mapping relationship from the network device.

4. The power control parameter determining method according to claim 1, wherein the method further comprises:

receiving radio resource control (RRC) signaling from the network device, wherein the RRC signaling comprises the at least one parameter subset, and each of the at least one parameter subset further comprises an identifier of the parameter subset.

5. The power control parameter determining method according to claim 1, wherein the at least one power control parameter comprises one or more of the following: nominal power, a pathloss compensation factor, and a closed-loop index.

6. The power control parameter determining method according to claim 1, wherein the uplink channel comprises at least one of a physical uplink shared channel (PUSCH) or a physical uplink control channel (PUCCH), and the uplink signal comprises an uplink sounding reference signal (SRS).

7. A power control parameter determining method, comprising:

determining a mapping relationship, wherein the mapping relationship comprises a mapping relationship between an identifier of at least one parameter subset and at least one transmission configuration indicator (TCI) state, each of the at least one parameter subset comprises at least one power control parameter set corresponding to an uplink signal or an uplink channel, the at least one TCI state comprises an activated first TCI state, and the first TCI state comprises an identifier of a power control parameter set;

sending the mapping relationship to a terminal device; and sending first signaling to the terminal device, wherein the first signaling comprises a first value of a downlink control information (DCI) field, and the first value indicates the first TCI state, wherein the uplink signal or uplink channel is in a one-to-one correspondence with the at least one power control parameter set.

8. The power control parameter determining method according to claim 7, wherein the mapping relationship between the identifier of the at least one parameter subset and the at least one TCI state comprises a mapping relationship between an identifier of the at least one power control parameter and the at least one TCI state, or a mapping relationship between an identifier of at least one pathloss reference signal and the at least one TCI state.

9. The power control parameter determining method according to claim 7, wherein the method further comprises:

sending radio resource control (RRC) signaling to the terminal device, wherein the RRC signaling comprises the at least one parameter subset, and each of the at least one parameter subset further comprises an identifier of the parameter subset.

10. The power control parameter determining method according to claim 7, wherein the at least one power control parameter comprises one or more of the following: nominal power, a pathloss compensation factor, and a closed-loop index.

11. The power control parameter determining method according to claim 7, wherein the uplink channel comprises at least one of a physical uplink shared channel (PUSCH) or a physical uplink control channel (PUCCH), and the uplink signal comprises an uplink sounding reference signal (SRS).

12. A communication apparatus, comprising: a transceiver and a processor, wherein the communication apparatus is configured to:

receive first signaling from a network device, wherein the first signaling comprises a first value of a downlink control information (DCI) field, the first value indicates an activated first transmission configuration indicator (TCI) state, and the first TCI state comprises an identifier of a power control parameter set; and determine, based on a mapping relationship, a first parameter subset corresponding to the first TCI state, wherein:

the mapping relationship comprises a mapping relationship between an identifier of at least one parameter subset and at least one TCI state, the at least one TCI state comprises the first TCI state, the first parameter subset is one of the at least one parameter subset, each of the at least one parameter subset comprises at least one power control parameter set corresponding to an uplink signal or an uplink channel, and the power control parameter set comprises at least one power control parameter, wherein the uplink signal or uplink channel is in a one-to-one correspondence with the at least one power control parameter set.

13. The apparatus according to claim 12, wherein the mapping relationship between the identifier of the at least one parameter subset and the at least one TCI state comprises a mapping relationship between an identifier of the at least one power control parameter and the at least one TCI state, or a mapping relationship between an identifier of at least one pathloss reference signal and the at least one TCI state.

14. The apparatus according to claim 12, wherein the communication apparatus is further configured to receive the mapping relationship from the network device.

15. The apparatus according to claim 12, wherein the communication apparatus is further configured to receive radio resource control (RRC) signaling from the network device, wherein the RRC signaling comprises the at least one parameter subset, and each of the at least one parameter subset further comprises an identifier of the parameter subset.

16. The apparatus according to claim 12, wherein the at least one power control parameter comprises one or more of the following: nominal power, a pathloss compensation factor, and a closed-loop index.

17. The apparatus according to claim 12, wherein the uplink channel comprises at least one of a physical uplink shared channel (PUSCH) or a physical uplink control channel (PUCCH), and the uplink signal comprises an uplink sounding reference signal (SRS).

* * * * *